US012718628B2

(12) United States Patent
Vedula et al.

(10) Patent No.: US 12,718,628 B2
(45) Date of Patent: Aug. 25, 2026

(54) MACHINE LEARNING MODEL DEPLOYMENT FOR EQUIPMENT

(71) Applicant: Salesforce, Inc., San Francisco, CA (US)

(72) Inventors: Sundar Ram Vedula, Bangalore (IN); Rajdeep Dua, Hyderabad (IN); Mritunjay Kumar, Bangalore (IN); Divya Rai, Bangalore (IN); Rakesh Mondal, Bangalore (IN); Nimesh Gupta, Bangalore (IN)

(73) Assignee: Salesforce, Inc., San Francisco, CA (US)

( * ) Notice: Subject to any disclaimer, the term of this patent is extended or adjusted under 35 U.S.C. 154(b) by 89 days.

(21) Appl. No.: 18/394,819

(22) Filed: Dec. 22, 2023

(65) Prior Publication Data

US 2025/0087027 A1 Mar. 13, 2025

(30) Foreign Application Priority Data

Sep. 11, 2023 (IN) ............................. 202341061069

(51) Int. Cl.

*G07C 5/00* (2006.01)
*B60R 16/023* (2006.01)
(Continued)

(52) U.S. Cl.

CPC .......... *G07C 5/006* (2013.01); *B60R 16/0234* (2013.01); *G05B 23/0283* (2013.01);
(Continued)

(58) Field of Classification Search

CPC .... G07C 5/006; G07C 5/008; B60R 16/0234; G05B 23/0283; G06Q 30/01; G08B 21/182
See application file for complete search history.

(56) References Cited

U.S. PATENT DOCUMENTS

2020/0103894 A1* 4/2020 Cella .................... G05B 19/418
2020/0250026 A1* 8/2020 Popelka .............. G06F 11/0769
(Continued)

OTHER PUBLICATIONS https://neurostars.org/t/does-a-machine-learning-algorithm-copy-the-data-it-learns-from/19416, May 2021 (Year: 2021).*

*Primary Examiner* — Navid Z. Mehdizadeh
*Assistant Examiner* — Oliver Tan
(74) *Attorney, Agent, or Firm* — Holland & Hart. LLP

(57) ABSTRACT

A machine learning model hosted on a cloud platform may be used to proactively predict if a maintenance procedure should be performed for a vehicle. In some examples, to support the prediction, the machine learning model may be connected to a different cloud platform that includes a customer relationship management (CRM) system and receives data from sensors of the vehicle. As such, the cloud platform with the CRM data may transmit the CRM data and the sensor data of the vehicle to the cloud platform hosting the machine learning model to aid in generating the maintenance procedure predictions. Further, the maintenance procedure predictions may also include the generation of a prediction score associated with a maintenance procedure. In some examples, the prediction score may satisfy a prediction score threshold, thus a notification may be transmitted to a computing device that indicates the maintenance procedure to be performed for the vehicle.

20 Claims, 11 Drawing Sheets

(51) Int. Cl.
*G05B 23/02* (2006.01)
*G06Q 30/01* (2023.01)
*G08B 21/18* (2006.01)

(52) U.S. Cl.
CPC ............. *G06Q 30/01* (2013.01); *G07C 5/008* (2013.01); *G08B 21/182* (2013.01)

(56) References Cited

U.S. PATENT DOCUMENTS

2023/0112083 A1* 4/2023 Jermann .................. G06F 9/54 700/29
2024/0086860 A1* 3/2024 Bruchhardt ........... G06Q 10/20

* cited by examiner

MACHINE LEARNING MODEL DEPLOYMENT FOR EQUIPMENT

CROSS REFERENCE

The present Application for Patent claims the benefit of and priority to Indian Patent Application number 202341061069, by Vedula et al., entitled "MACHINE LEARNING MODEL DEPLOYMENT FOR EQUIPMENT MAINTENANCE PREDICTIONS," filed Sep. 11, 2023, assigned to the assignee hereof, and is expressly incorporated by reference in its entirety herein.

FIELD OF TECHNOLOGY

The present disclosure relates generally to database systems and data processing, and more specifically to machine learning model deployment for equipment maintenance predictions.

BACKGROUND

A cloud platform (i.e., a computing platform for cloud computing) may be employed by multiple users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some examples, vehicles (e.g., automobiles) may be configured with various sensors to measure a performance of a vehicle component or component system. The sensors may also notify (e.g., alert) users when a value is below a threshold to prevent a failure of the corresponding component or component system. In such examples, the sensors of a vehicle may be isolated to a single component or component system and may be unable to communicate with other sensors. However, some vehicle component failures may be related to multiple components or a combination of components. As such, vehicle component failures related to multiple combinations of components may be undetectable by the sensors thus resulting in unexpected and unpredictable vehicle component failures.

DETAILED DESCRIPTION

Figure 1:
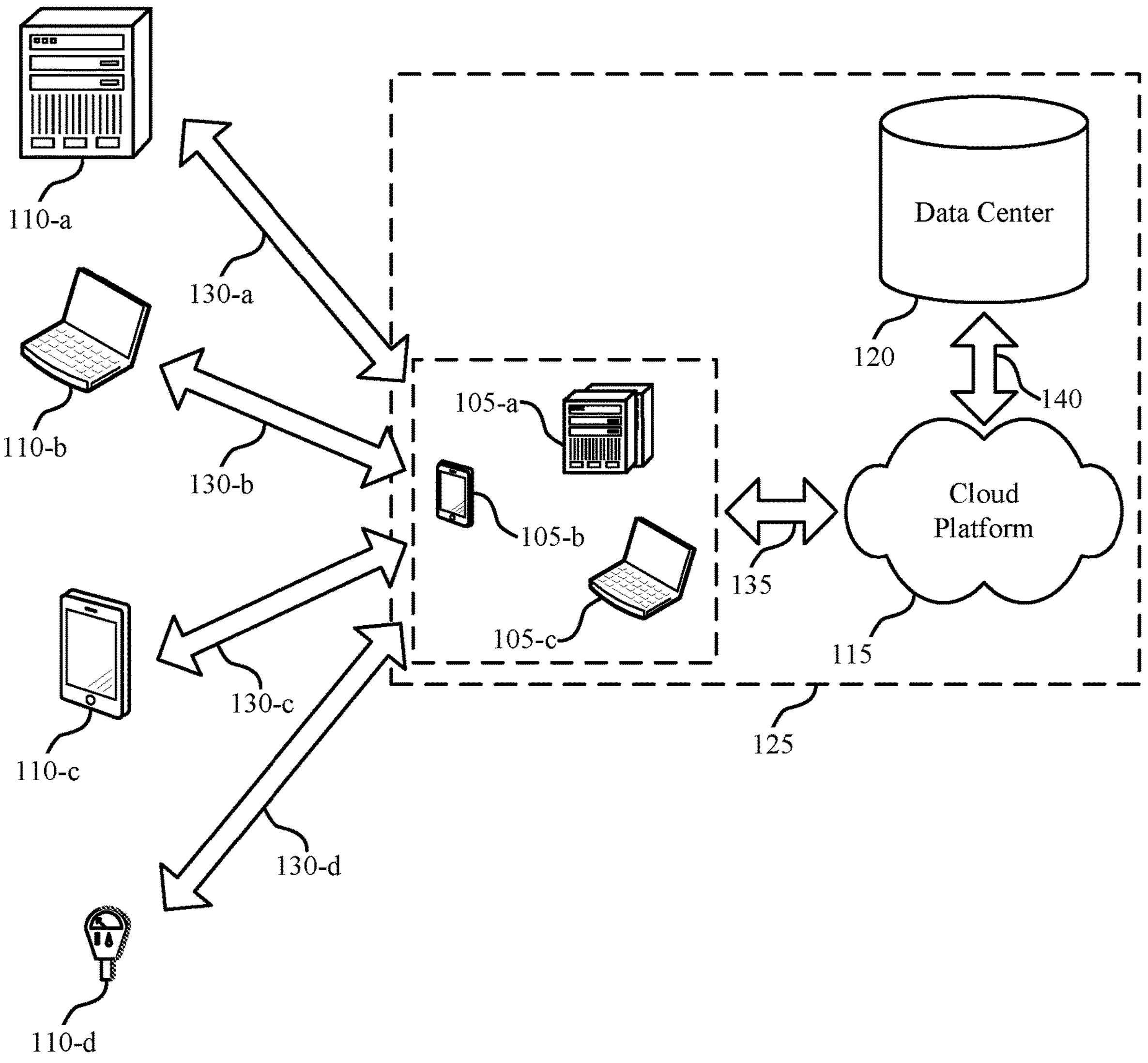
FIG. 1 illustrates an example of a data processing system that supports machine learning model deployment for equipment maintenance predictions in accordance with aspects of the present disclosure.

In some examples, vehicles may be configured with one or more sensors that measure different functionalities of the vehicle. For example, a vehicle may be configured with sensors to measure the specific components and specific values of the component, such as, without limitation, engine rotations per minute (RPM), oil pressure, fuel pressure, coolant pressure, or any combination thereof. Further, as technology of vehicles advance, more vehicles may be connected to the internet (e.g., via a wireless local area network (WLAN) connection or cellular network connection) and vehicles may be able to share the sensor data obtained from the sensors with external devices via the internet connection. For example, a vehicle maintenance service provider (e.g., a mechanic or vehicle dealership service center) may have a cloud platform configured with a data stream to receive real-time data from the vehicle. As such, a vehicle may share (e.g., transmit) the sensor data to the cloud platform periodically (e.g., every day, week, month), semi-periodically (e.g., every day and a half), or aperiodically (e.g., triggered by a request or an event).

Using the sensor data, received by the cloud platform, a machine learning model may predict possible issues of the vehicle or maintenance procedures to be performed for the vehicle. For example, the sensor data may be used as an input to a machine learning model (e.g., the sensor data is a machine learning model input) to generate a prediction score for one or more maintenance procedures. As such, the machine learning model may use its training and the sensor data to generate a prediction score for a maintenance procedure. In some cases, if a prediction score for a maintenance procedure is above a prediction score threshold, the cloud platform may transmit a notification to a computing device indicating that the corresponding maintenance procedure should be performed on the vehicle. Using such techniques may be more efficient than traditional techniques of having the individual sensors of the vehicle alert the vehicle operator when a sensor measures a value above a threshold. For example, such notifications may be static and isolated from other sensor values and may be unable to alert the vehicle operator to a larger issue. However, as the machine learning model may receive data from some or all the sensors of the vehicle collectively (in addition to sensor data from other vehicles), the machine learning model is capable of detecting vehicle component issues of failures before they occur and result in time-consuming and expensive (e.g., monetarily expensive) repairs. As such, the techniques of the present disclosure may allow vehicle owners to avoid or limit costly repairs due to a failing component causing other components to fail.

In some examples, the machine learning model may be hosted via one or more second cloud platforms that may be separate from a first cloud platform that receives and stores the data from the vehicle. In such examples, the second cloud platforms may be configured to use the data stored at the first cloud platform to execute and train the machine learning model while refraining from copying the data to the second cloud platforms to save space (e.g., memory) within the second cloud platforms. Therefore, the time consumption of training the machine learning model may be reduced. Further, the data stored at the first cloud platform may include the real-time data from the sensors of the vehicle, historic sensor data from the vehicle (e.g., average measurements from sensors over time), sensor data from vehicles having a same vehicle type as the vehicle (e.g., manufacturer, vehicle model, vehicle model year), customer relationship management (CRM) data, or any combination thereof. In some cases, the CRM data may be associated with vehicle owners, vehicle dealers, vehicle manufacturers, or any combination thereof. For example, the CRM data may include the ideal values for a sensor based on data from the vehicle manufacturer, data related to recalls or common issues of vehicles of the same vehicle type, or customer or vehicle location data. As such, the machine learning model may use both the data from the sensors of the vehicle (e.g., real-time data and historic data) and the CRM data to train and execute the machine learning model in generating prediction scores for predicting maintenance procedures. Further, it should be appreciated by a person skilled in the art that one or more aspects of the disclosure may be implemented with respect to other items of machinery which may contain one or more sensors (e.g., an elevator, a transformer, a medical device, other vehicles or other equipment items (collectively "equipment items").

Aspects of the disclosure are initially described in the context of an environment supporting an on-demand database service. Additional aspects of the disclosure are described with reference to a computing system, a machine learning model diagram, and a process flow. Aspects of the disclosure are further illustrated by and described with reference to apparatus diagrams, system diagrams, and flowcharts that relate to machine learning model deployment for equipment maintenance predictions.

FIG. 1 illustrates an example of a system 100 for cloud computing that supports machine learning model deployment for equipment maintenance predictions in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may be an example of a multi-tenant system. For example, the system 100 may store data and provide applications, solutions, or any other functionality for multiple tenants concurrently. A tenant may be an example of a group of users (e.g., an organization) associated with a same tenant identifier (ID) who share access, privileges, or both for the system 100. The system 100 may effectively separate data and processes for a first tenant from data and processes for other tenants using a system architecture, logic, or both that support secure multi-tenancy. In some examples, the system 100 may include or be an example of a multi-tenant database system. A multi-tenant database system may store data for different tenants in a single database or a single set of databases. For example, the multi-tenant database system may store data for multiple tenants within a single table (e.g., in different rows) of a database. To support multi-tenant security, the multi-tenant database system may prohibit (e.g., restrict) a first tenant from accessing, viewing, or interacting in any way with data or rows associated with a different tenant. As such, tenant data for the first tenant may be isolated (e.g., logically isolated) from tenant data for a second tenant, and the tenant data for the first tenant may be invisible (or otherwise transparent) to the second tenant. The multi-tenant database system may additionally use encryption techniques to further protect tenant-specific data from unauthorized access (e.g., by another tenant).

Additionally, or alternatively, the multi-tenant system may support multi-tenancy for software applications and infrastructure. In some cases, the multi-tenant system may maintain a single instance of a software application and architecture supporting the software application in order to serve multiple different tenants (e.g., organizations, customers). For example, multiple tenants may share the same software application, the same underlying architecture, the same resources (e.g., compute resources, memory resources), the same database, the same servers or cloud-based resources, or any combination thereof. For example, the system 100 may run a single instance of software on a processing device (e.g., a server, server cluster, virtual machine) to serve multiple tenants. Such a multi-tenant system may provide for efficient integrations (e.g., using application programming interfaces (APIs)) by applying the integrations to the same software application and underlying architectures supporting multiple tenants. In some cases, processing resources, memory resources, or both may be shared by multiple tenants.

As described herein, the system 100 may support any configuration for providing multi-tenant functionality. For example, the system 100 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The system 100 may support scaling of tenants within the multi-tenant system, for example, using scale triggers, automatic scaling procedures, scaling requests, or any combination thereof. In some cases, the system 100 may implement one or more scaling rules to enable relatively fair sharing of resources across tenants. For example, a tenant may have a threshold quantity of processing resources, memory resources, or both to use, which in some cases may be tied to a subscription by the tenant.

In some examples of the system 100, a cloud client 105 may be an example of a vehicle connected to the cloud platform 115 via the network connection 135 (e.g., an internet connection). Further, the vehicle may include one or more sensors (e.g., one or more contacts 110-*d*) that measure data associated with specific components or components systems of the vehicle. As such, the vehicle may communicate the sensor data with the cloud platform 115 via the network connection 135. Additionally, or alternatively, the data center 120 may host a machine learning (ML) model and may receive data from the cloud platform 115 via the connection 140. As such, the data center 120 hosting the ML model may be configured to use data from the cloud platform 115 to execute and train the ML model.

Further, the one or more sensors (e.g., contacts 110-*d*) of a vehicle, which may be an example of a cloud client 105, may be used to measure performance metrics of components or component systems of the vehicle. For example, there may be one or more sensors corresponding to different functions of an engine of a vehicle and a sensor for a battery of the vehicle. However, the engine sensors may be unable to communicate with the battery sensor of the vehicle, and vice versa. Additionally, or alternatively, different engine sensors (or other sensors) may be unable to communicate with other engine sensors. As such, issues with the engine and issues with the battery of a vehicle may be handled separately as the sensors may be isolated from each other. However, issues with a battery may affect the engine system of a vehicle. For example, a relatively weak battery (e.g., a battery producing a lower electrical current than intended) may affect the performance of the engine and may cause components of the engine to fail. Further, a vehicle operator may be unaware of such issues as the battery may be just above or just satisfying a threshold for a notification to be signaled to the vehicle operator (e.g., via a warning light within the vehicle). As such, components of the engine may fail or to begin to fail, and the vehicle operator may be unaware of the cause of the issue or that the issue may be occurring. Additionally, a combination of sensor data may be indicative of preventative maintenance that may be helpful in preventing or limiting failures or conditions that lead to failure. However, as noted, individual sensor data or current threshold indications may not be helpful in identifying when preventative maintenance may be helpful.

Using the techniques of the present disclosure, a machine learning model may combine the data from all the sensors of the vehicle and data from a CRM platform to predict when a component may fail or predict when maintenance may be advisable. As such, based on the prediction, a notification may be transmitted to a computing device (e.g., a cloud client 105). To generate the prediction, a machine learning model may generate a prediction score (e.g., a value from 0 to 1) of a maintenance procedure. For example, a prediction score may correspond with a condition of the engine of a vehicle. In some cases, if the prediction score exceeds a prediction score threshold, the notification may indicate that a maintenance procedure may enhance the vehicle performance.

In some examples, such a prediction score may be generated by the machine learning model based on the machine learning model using both the data from the sensors of the vehicle and the data from the CRM platform. The CRM platform may include information related to the vehicle type of the vehicle (e.g., the manufacturer, model, model year). Such information may include data related to the expected lifespan of components set by the manufacturer, an average lifespan of components based on other vehicles of the same vehicle type, maintenance previously performed on the vehicle, accident reports associated with the vehicle, or any combination thereof. The CRM data may also include information related to the customer or driver, location of the vehicle or vehicle owner or driver, or a combination thereof. Using such information in combination with the sensor data the machine learning model may generate more accurate predictions. As such, the predictions generated by the machine learning model may proactively notify users of issues and may enable users to act on the suggested maintenance procedures to prevent a component or component system failure.

For example, in some cases, a vehicle maintenance service provider may host or utilize a cloud platform 115 that may be connected to the vehicle via the network connection 135. The vehicle maintenance service provider may also have a CRM platform within the cloud platform 115 that may include information related to the vehicle. As such, the vehicle maintenance service provider may also receive the sensor data from the vehicle and store the sensor data within the cloud platform 115. Using the data from the CRM platform and the sensor data, the vehicle maintenance service provider may use a machine learning model to proactively predict maintenance to be performed on the vehicle. For example, the machine learning model controlled by the vehicle maintenance service provider may be configured to look at changes in sensor data of a vehicle over time.

That is, the machine learning model may be configured to detect changes in a component's performance. In some examples, the machine learning model may detect that a component (e.g., the engine) performance may have decreased over a period (e.g., a month) and may predict that the component performance may continue to decrease. As such, the prediction score associated with an engine maintenance procedure may be relatively high (e.g., 0.9) and may satisfy or exceed a prediction score threshold (e.g., 0.6). Based on the prediction score satisfying or exceeding the prediction score threshold, the vehicle maintenance service provider may transmit, via the cloud platform 115 or via other communication facilities, a notification to the vehicle owner indicating that the engine performance of the vehicle has been decreasing and may continue to decrease. As such, the vehicle owner may schedule an engine maintenance procedure soon to decrease the risk of an engine failure. Therefore, the machine learning model may allow users to receive predictions of component failures and issues and proactively schedule repair procedures to prevent a component failure, thereby improving the vehicle performance and longevity.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
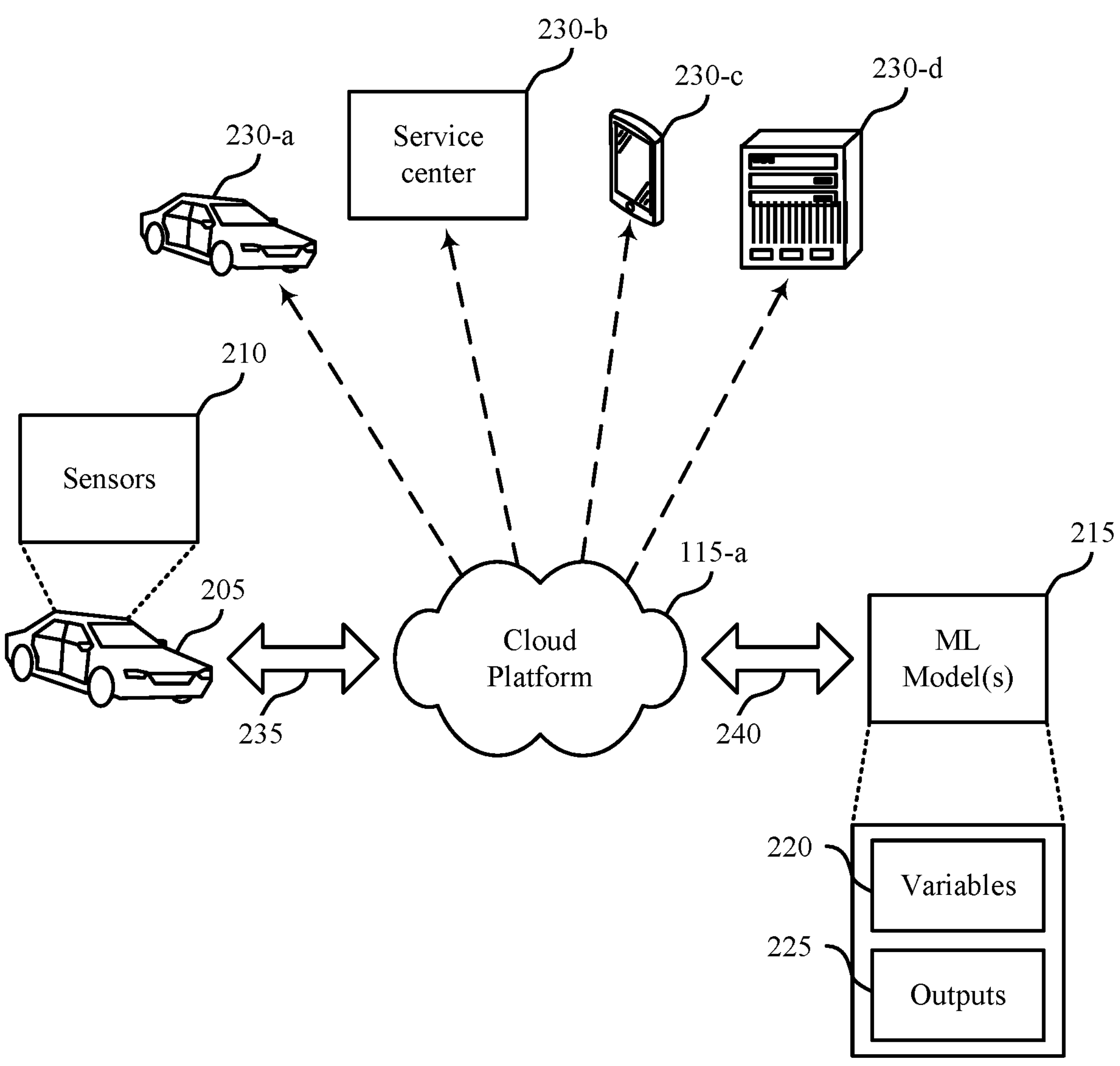
FIG. 2 shows an example of a computing system that supports machine learning model deployment for equipment maintenance predictions in accordance with aspects of the present disclosure.

FIG. 2 shows an example of a computing system 200 that supports machine learning model deployment for equipment maintenance predictions in accordance with aspects of the present disclosure. In some examples, the computing system 200 may be implemented by or may implement the system 100. For example, the computing system 200 may include a cloud platform 115-*a*, which may be an example of the cloud platform 115 described with reference to FIG. 1. Further, the computing system 200 may include a vehicle 205 containing one or more sensors 210, a machine learning model 215 that includes a set of variables 220 and a set of outputs 225, and one or more computing devices 230 (e.g., a computing device 230-*a*, a computing device 230-*b*, a computing device 230-*c*, and a computing device 230-*d*). In some examples, the vehicle 205 may be connected to and may communicate with the cloud platform 115-*a* via a network connection 235 and the cloud platform 115-*a* may be connected to and communicate with the machine learning model 215 via a connection 240. The network connection 235 may be an example of the network connection 135 and the connection 240 may be an example of the connection 140, the network connection 135 and the connection 140 described with reference to FIG. 1.

The computing system 200 may include the vehicle 205, which may be an example of an automobile or any other device or equipment that includes one or more sensors 210. The vehicle 205 may generate a set of telematic data (e.g., sensor data) based on using the one or more sensors 210 to measure the performance of the vehicle 205. For example, the one or more sensors 210 of the vehicle 205 may generate measurements of the engine RPM, oil pressure (e.g., the engine oil), fuel pressure, coolant pressure, oil temperature, coolant temperature, or any other sensor-derived measurements. In some examples, when the vehicle 205 generates the telematic data from the one or more sensors 210, the telematic data may correspond to an associated event code. The event code (e.g., a diagnostic trouble code (DTC)) generated may be a five character code where each character of the code may assist a user in identifying an issue being detected by the one or more sensors 210 of the vehicle 205. For example, the first character of the event code may be a letter that indicates the subset of codes where the detected malfunction of the vehicle 205 may be associated with (e.g., 'P' for powertrain codes, 'B' for body codes, 'C' for chassis codes, and 'U' for network codes). Following, the next character of the code may be a number (or other character) where a value of 0) is indicative of a generic issue and a value of 1 is indicative of a manufacturer specific issue. The next character may be a value from 0 to 8 indicating a subclass of issues (e.g., 1 for fuel and air metering. 2 for fuel and air metering (for an injector circuit malfunction), 3 for ignition system or misfires, 4 for auxiliary emission controls, 5 for vehicle speed and idle control systems, 7 for transmission, and 8 for transmission). Lastly, the last two characters may indicate a specific fault index. For example, if the event code is P0305 the event code may indicate a powertrain code that is a generic issue and related to ignition systems and misfires. However, in most cases, such event code may only appear while getting diagnostics completed for a vehicle and not when the issue first occurs or when conditions are indicative that these issues may occur soon without preventative maintenance.

As such, the techniques of the present disclosure may describe using a machine learning model 215 to predict the condition of a vehicle's engine, predict preventative maintenance, or any combination thereof. To support using the machine learning model 215, the vehicle 205 may transmit the telematic data from the one or more sensors 210 to the cloud platform 115-*a* via the network connection 235. For example, the vehicle 205 may be capable of supporting an internet connection (e.g., a WLAN or cellular connection) with the cloud platform 115-*a* and may transmit the telematic data to the cloud platform 115-*a* periodically, semi-periodically, or aperiodically. Additionally, or alternatively, the cloud platform 115-*a* may be an example of a CRM platform within a data cloud.

Using the telematic data received from the sensors 210 of the vehicle 205, the cloud platform 115-*a* may communicate with the machine learning model 215 via the connection 240. In some examples, the machine learning model 215 may generate a binary prediction where a value of 1 may indicate a component or component system of the vehicle 205 may be operating as intended and a value of 0 may indicate that the component or component system of the vehicle 205 may not be operating as intended, or vice versa. In some other cases, the machine learning model 215 generates a prediction score between the value of 0 and 1. Such a prediction score may indicate how probable a component or component system is to fail over a period or that may indicate that a preventative maintenance procedure may be advised (e.g., where a prediction score closer to I may indicate the component system is more likely to fail or that the maintenance procedure is more essential). Further, a prediction score at or above a prediction score threshold may indicate that maintenance may be required for a corresponding component or component system of the vehicle 205 within the period to prevent the component or component system from failing. As such, the machine learning model may enable vehicle owners and vehicle maintenance service providers to proactively address potential issues prior to a component or component system failure.

Additionally, or alternatively, the machine learning model may be hosted on one or more second cloud platforms 115 that may be separate from the cloud platform 115-*a*. For example, the one or more second cloud platforms 115 may be cloud platform 115 designed for on-demand cloud computing and may be configured as a cloud-based machine learning platform and the cloud platform 115-*a* may be configured as a data cloud used to store data. As such, a second cloud platform 115 may enable the creation, training, and deployment of machine learning models (e.g., the machine learning model 215) within a cloud-based environment. To support the connection of the second cloud platform 115, the cloud platform 115-*a* may be configured with a data stream and a data model object. The connection between the cloud platform 115-*a* and the second cloud platform 115 may be described elsewhere herein with reference to FIG. 3. Further, the cloud platform 115-*a* may include training data for the machine learning model 215 via historic telematic data from the sensors 210 of the vehicle 205 and CRM data stored within the cloud platform 115-*a*. The CRM data may include data corresponding to the vehicle and other vehicles of the same vehicle type and/or data corresponding to customers, dealerships, and the like. For example, if the vehicle is of a first vehicle type, the CRM data may include data associated with the first vehicle type and other data from other vehicles of the first vehicle type. Additionally, or alternatively, the cloud platform 115-*a* may be a CRM platform where the CRM platform includes both the data associated with the vehicle type of the vehicle 205 and the telematic data from the sensors 210 of the vehicle 205.

Using the data in the cloud platform 115-*a*, the cloud platform 115-*a* may map each data parameter within the cloud platform 115-*a* for the vehicle 205 to a respective model entity of the machine learning model 215. Further, the cloud platform 115-*a* may use a data wrangler to extract, transform, and load (ETL) the data within the cloud platform 115-*a* by importing the data from the CRM and the telematic data to transform the data, featurize the data, and analyze the data to form a single data set to be used by the machine learning model 215. As such, the ETLed data (e.g., the extracted, transformed, and loaded data) may be fed to the machine learning model 215 on the second cloud platform 115.

In some cases, during the configuration of the second cloud platform 115, the second cloud platform may create or use a data transformation (e.g., a data wrangler) to import the data from the cloud platform 115-*a*. For example, the computing system 200 may use data integration techniques to pull (e.g., extract) the data from the cloud platform 115-*a* to the second cloud platform 115 while refraining from copying the data from the cloud platform 115-*a*. To perform such data integration techniques, a structured query language (SQL) query may be used to select which data from the CRM platform of the cloud platform 115-*a* should be used for the machine learning model 215. Based on the SQL query, the second cloud platform 115 may use the data wrangler to generate a data set and finalize the features to be fed to the machine learning model 215. As such, the data may be imported and sourced directly from the cloud platform 115-*a* instead of copied from the cloud platform 115-*a* and stored at the second cloud platform 115 which may allow for additional storage space at the second cloud platform 115 to be available.

In some examples, the machine learning model 215 may use the data imported from the cloud platform 115-*a* to customize the machine learning model 215 per user. For example, a vehicle maintenance service provider may create and train separate machine learning models 215 for different vehicle types, different vehicle manufacturers, different vehicle owners, or any combination thereof. As such, the machine learning model 215 may be one machine learning model 215 of a set of machine learning models 215 where each machine learning model 215 of the set of machine learning models 215 can be associated with a respective vehicle type of a set of vehicle types. Therefore, users, such as vehicle maintenance service providers, may implement a bring your own model (BYOM) approach within the second cloud platform 115 to use external machine learning platforms for creating and deploying custom machine learning models. Utilization of the second cloud platform 115 may support the BYOM approach.

However, some cloud platforms 115 may limit users to a predefined set of machine learning models 215 and algorithms. As such, users may be unable to utilize customized machine learning models 215 in various computer programming languages. Such limitations may limit the use and effectiveness of the machine learning model 215 to generate maintenance predictions for a set of vehicle types. For example, if a vehicle maintenance service provider used a single machine learning model 215 for all the vehicle types in the set of vehicle types the machine learning model 215 may be too general and may be unable to generate accurate maintenance predictions for each vehicle type within the set of vehicle types. Further, the machine learning model 215 may involve extensive training and retraining causing delays in the use of the machine learning model 215. Therefore, by using the second cloud platform 115 that allows the BYOM approach, users may be able to leverage machine learning models 215 and algorithms for the machine learning models 215 by creating, training, and deploying customized (e.g., personalized) machine learning models 215 for specific use cases.

As such, users (e.g., vehicle maintenance service providers, vehicle dealers, vehicle manufacturers, or a combination thereof) may build, train, and fine tune the machine learning model 215, which may be customized for the vehicle 205 or the vehicle type of the vehicle 205, using the data from the cloud platform 115-*a* (e.g., the CRM data and the telematic data from the sensors 210 of the vehicle 205). Further, the machine learning model 215 may use both the CRM data and the telematic data from the sensors 210 of the vehicle 205 to generate the prediction score for a maintenance procedure. By using both the CRM data and the telematic data from the sensors 210 of the vehicle 205, the machine learning model 215 may be capable of accurately predicting if a maintenance procedure may be performed for a component.

For example, the machine learning model 215 may aggregate all the data from the telematic data from the sensors 210 of the vehicle 205 together. That is, the machine learning model 215 may include multiple features or parameters corresponding to the different sensors 210 of the vehicle 205 (e.g., engine RPM, temperature, pressure, and other sensor derived data). The machine learning model 215 may use each of the parameters together for generating the prediction score for a maintenance procedure. Traditionally, the sensors 210 of the vehicle 205 may be managed separately from each other, however, by collectively using all telematic data from the sensors 210, the machine learning model 215 may be capable of learning trends and correlations to detect or predict issues before they occur. For example, the machine learning model 215 may recognize when motor malfunctions are beginning or a drop of pressure within a fuel pump. In some examples, as described elsewhere herein, the machine learning model 215 may also determine a decline in performance of the battery of the vehicle 205.

For example, when the battery of the vehicle 205 starts to fail, the battery may output a weak electrical current. As such, other components of the vehicle 205 may operate more intensely to make up for the degraded performance of the battery, thus, the performance of other components of the vehicle 205 may also begin to decline. The machine learning model 215 may detect that such components may be working at a higher intensity than normal, and by having access to all the telematic data from the sensors 210 of the vehicle 205 the machine learning model 215 can detect that the performance of the battery has decreased accordingly. As such, the machine learning model 215 may generate a prediction score associated with the various components of the vehicle 205 and the prediction score may be indicative that the battery of the vehicle 205 should be replaced before other components are negatively affected. Therefore, the machine learning model 215 may be used to predict maintenance based on a machine learning algorithm (e.g., a random forest classifier algorithm) by receiving data from component systems (e.g., the engine system, the steering system, the braking system) and components (e.g., the motor, battery, fuel pump) that may be collected by the cloud platform 115-*a* for analysis and diagnostics of the condition of the vehicle 205.

The machine learning model 215 may also use the CRM data associated with the vehicle type of the vehicle 205 in combination with the real-time telematic data from the sensors 210 of the vehicle 205. The CRM data may include information such as the average sensor readings for the sensors 210 of the vehicle 205 and thresholds that may indicate issues. The CRM data may also include information corresponding to relationships between different sensors 210 of the vehicle 205. For example, the CRM data may indicate that there may be a relationship between a battery sensor and the engine system sensors. As such, the CRM data may indicate that the measurements of the battery sensor may be correlated with the measurements of the engine system sensors. Further, the CRM data may indicate that a decrease in the battery levels (e.g., a decrease in the electric current outputted by the battery) may result in a decrease in engine performance. In another example, the CRM data may indicate the average lifespan (or mileage span) of the components of the vehicle 205 and the year of the vehicle (e.g., to indicate how old the vehicle 205 may be). In some examples, the sensor data may include mileage data associated with usage of the vehicle, which may be used to predict when components are due for maintenance or approaching failure.

Using such information in combination with the telematic data from the sensors 210 of the vehicle 205, the machine learning model 215 may be capable of determining whether a decrease in two separate components or component systems may be related or coincidental. Further, the combination of data may support the machine learning model 215 in producing more accurate maintenance predictions. For example, in a first scenario, the telematic data from the sensors 210 of the vehicle 205 may indicate that the performance of a component within the engine system may be decreasing and that the performance of a component within the brake system may be decreasing. In some examples, the CRM data may indicate that there may be no correlation between the two components. However, the CRM data may indicate that the components performance may degrade over time and may indicate the average lifespan of the component (e.g., as indicated by the manufacturer, an average of data from vehicles of the same vehicle type as the vehicle type, or both). As such, using CRM data and the telematic data from the sensors 210 of the vehicle 205, the machine learning model 215 may generate a prediction score of how likely the components are to fail within a preset period (e.g., a few months to a year) and thus should be repaired or replaced. In some cases, the period may be set such that a vehicle may continue to operate relatively normally for a relatively long period of time without any maintenance on the indicated component, however, after too long of a period of time, the operation of the vehicle may fall below a threshold level.

If the prediction score for a component satisfies or is above a prediction score threshold, the cloud platform 115-*a* may notify a computing device 230 that may be associated with the vehicle of the maintenance prediction. In some examples, the notification may be associated with a specific maintenance procedure or a specific component or component system of the vehicle 205. In some cases, the second cloud platform 115 may transmit an indication of the maintenance prediction to the cloud platform 115-*a* based on the machine learning model 215 being registered at the cloud platform 115-*a*. Further descriptions of the registration and connection may be described elsewhere herein with reference to FIG. 3. Further, the cloud platform 115-*a* may notify the computing device 230 with the prediction score for a component or component system of the vehicle 205, a maintenance prediction for a component or component system of the vehicle 205, or both. In some examples, the computing device 230 may be associated with a vehicle (e.g., the computing device 230-*a*), a vehicle maintenance service provider (e.g., the computing device 230-*b*), a smartphone or other user device (e.g., the computing device 230-*c*), or a database system for further analysis (e.g., the computing device 230-*d*). In some cases, the computing device 230-*c* may be owned by or operated by an owner of the vehicle, a vehicle maintenance worker (e.g., a mechanic), a vehicle salesperson, a manufacturer, a dealer, or any combination thereof.

Further, when notifying the computing devices 230 that a maintenance procedure may or should be performed on the vehicle 205, the cloud platform 115-*a* may apply a notification rule that specifies transmission parameters for the notification and the type of user or computing device 230 the notification is transmitted to may be based on the notification rule. In some cases, applying the notification rule may also include the cloud platform 115-*a* ingesting (e.g., determining) some data associated with the owner of the vehicle 205 to determine the transmission parameters of the notification. In some examples, the notification rule may also be based on a Next Best Action (NBA) functionality. The NBA functionality may be used to determine the best immediate actions to be conducted from a set of available actions at the cloud platform 115-*a*. The NBA may function be operated by an artificial intelligence (AI) system that applies a set of rules configured for a specific user or group and using recommendations, flows, and actions based on the condition of a vehicle. The recommendation may include the maintenance procedure being recommended based on the current condition of the vehicle, the flow may determine the time to transmit the notification and how to transmit the notification, and the actions may include one or more actions that a user may perform in response to the recommendation to improve the condition of the vehicle.

For example, if a prediction score for the engine system indicates a potential issue with the engine system, the recommendation of the notification may be that the vehicle should have an engine system maintenance procedure performed soon. Further, the action may be to schedule the maintenance procedure if the user being notified is the owner of the vehicle or to reach out to the owner of the vehicle if the user being notified is a vehicle maintenance service provider. In some examples, the notification rules may determine who the notification may be transmitted to. For example, a notification rule may indicate that if a vehicle 205 is over a threshold age (e.g., the vehicle 205 is over 10 years old) or a certain mileage, the notification may be transmitted to a vehicle salesperson to attempt to sell the owner of the vehicle 205 a new vehicle 205 instead of performing the maintenance procedure indicated by the prediction score from the machine learning model 215. In some examples, a notification rule may indicate that if the CRM data indicates that the vehicle 205 may be under a warranty, the vehicle maintenance service provider may receive the notification to reach out to the owner of the vehicle 205. In some other examples, a notification rule may indicate that if the indicated maintenance procedure is a maintenance procedure that a vehicle 205 owner may perform with relative ease and minimal knowledge or experience (e.g., an oil change, a battery change), the notification may be transmitted to the owner of the vehicle 205. Further, the user receiving the notification (e.g., the owner of the vehicle 205, the vehicle maintenance service provider, or the vehicle salesperson) may also configure the flow of the notification (e.g., how, and when the notification may be transmitted). For example, a user may set the flow to be that the notification may be received via an email, a text message, or a push notification of a mobile application and the user may configure the flow such that the notification is transmitted to the correct phone number or email address between a set time frame. Additionally, the cloud platform 115-*a*, based on the NBA, may generate or configure a notification that may be transmitted to the owner. For example, the cloud platform 115-*a* may generate an email or text that is to be transmitted by the dealership or maintenance provider to the owner requesting that the owner schedule the maintenance. In some cases, the cloud platform 115-*a* may access a calendar to suggest some potential dates and times for the maintenance procedure. As such, the calendar data and vehicle owner data may be examples of additional CRM data that may be used by the cloud platform 115 to perform techniques described herein.

As such, the users may choose to perform the action indicated in the notification or not, which may then be fed back to the machine learning model 215 for additional training. That is, the type of maintenance procedure performed and/or whether a procedure was performed may be input into the machine learning model to support additional feedback training. The machine learning model 215 may be retrained using such information along with the telematic data from the sensors 210 of the vehicle 205. Additionally, or alternatively, the machine learning model 215 may learn whether the maintenance procedure increased the lifespan of the vehicle 205 or components of the vehicle 205 based on inputting whether a procedure was performed on a vehicle. Further, if the component starts to decline soon after the maintenance procedure was performed, the machine learning model 215 may transmit a notification to the user that performed the maintenance procedure as a mistake may have been made while repairing the vehicle 205. Moreover, the machine learning model 215 may also add the telematic data from the sensors 210 of the vehicle 205 to the training data. By adding the telematic data from the sensors 210 of the vehicle 205 to the training data, the quantity of data used to train the machine learning model 215 may increase which also may allow the machine learning model to recognize and identify trends and correlations between the real-time telematic data and historic telematic data. Further, the connection (e.g., the connection 240) and link between the cloud platform 115-*a* and the second cloud platform to share the telematic data from the sensors 210 of the vehicle 205, the prediction scores, and the maintenance predictions may be describe elsewhere herein including with reference to FIG. 3. For example, the machine learning model 215 may be configured with a set of variables 220 and a set of outputs 225 and the machine learning model 215 may be connected to and registered with the cloud platform 115-*a*.

Figure 3:
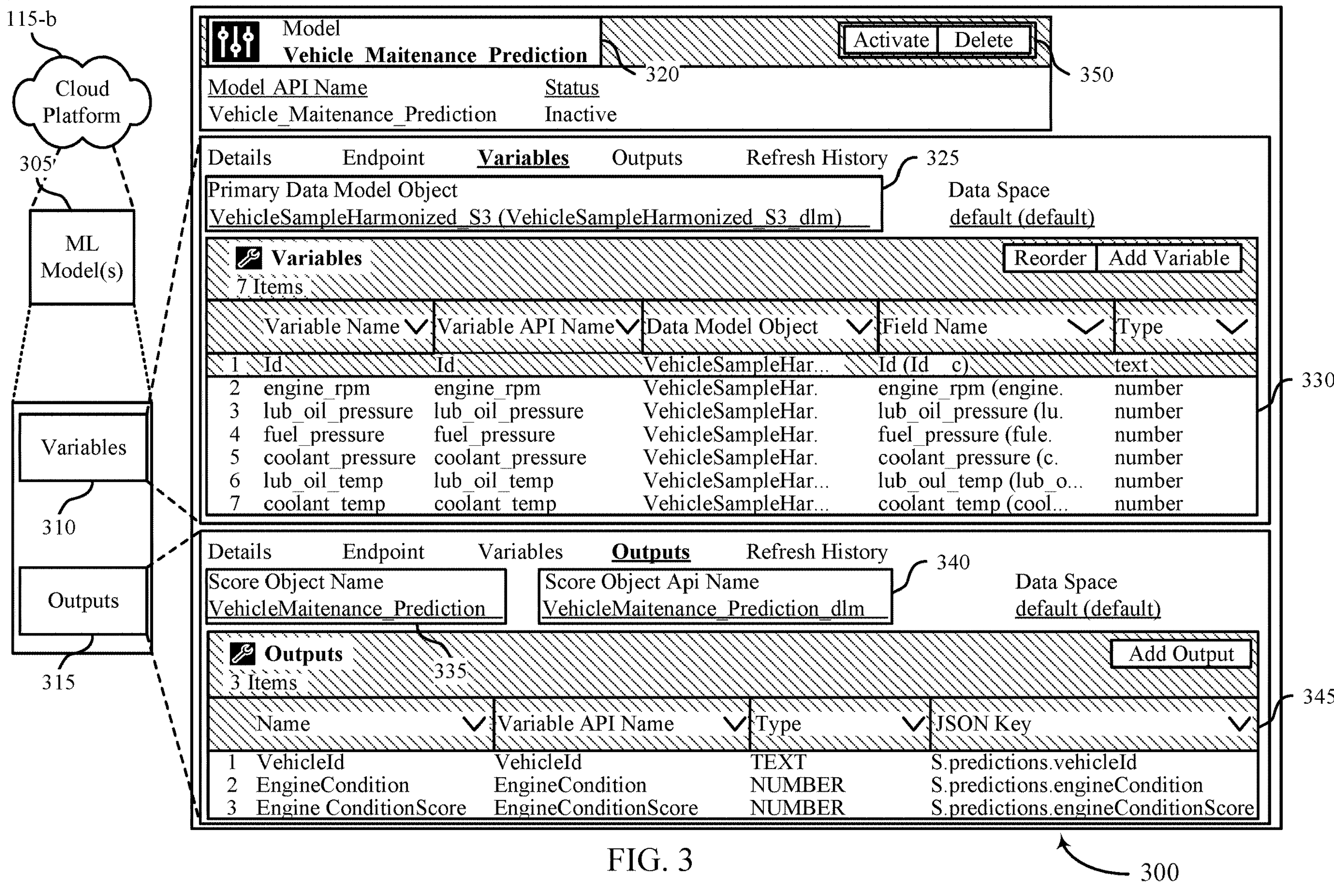
FIG. 3 shows an example of a machine learning model diagram that supports machine learning model deployment for equipment maintenance predictions in accordance with aspects of the present disclosure.

FIG. 3 shows an example of a machine learning model diagram 300 that supports machine learning model deployment for equipment maintenance predictions in accordance with aspects of the present disclosure. The machine learning model diagram 300 may be implemented by the system 100 or the computing system 200. For example, the machine learning model diagram 300 may include a cloud platform 115-*b* which may be an example of the cloud platform 115 described with reference to FIG. 1. Further, the machine learning model 305 may be hosted on a second cloud platform 115 (e.g., not illustrated) that is separate from the cloud platform 115-*b* that includes a CRM platform and telematic data from one or more sensors of a vehicle. In some examples, the machine learning model 305 may also include a set of variables 310 and a set of outputs 315 associated with the set of variables.

In some examples, to support the communication between the cloud platform 115-*b* and the second communication platform 115 that may host the machine learning model 305, the machine learning model 305 may be registered with the cloud platform 115-*b*. The cloud platform 115-*b* may store the CRM data described elsewhere herein and receive real-time telematic data from one or more sensors of a vehicle. As such, by having the machine learning model 305 registered within the cloud platform 115-*b*, the machine learning model 305 may be enabled to generate maintenance predictions based on incoming telematics data. That is, the machine learning model 305 may be updated and executed each time the cloud platform 115-*b* receives telematic data from the sensors of a vehicle, where the machine learning model 305 can also receive and use the telematic data to generate the maintenance predictions. As such, the machine learning model may enable users (e.g., vehicle owners and vehicle maintenance service providers) to proactively address issues with components or component systems of a vehicle using real-time data.

As part of the registration of the machine learning model 305 within the cloud platform 115-*b*, the machine learning model 305 may be given a name 320 (e.g., Vehicle Maintenance Prediction). For example, as described elsewhere herein with reference to FIG. 2, the machine learning model 305 may be one of a set of machine learning models 305 for different vehicle types of a set of vehicle types. As such, the cloud platform 115-*b* may assign the name 320) (e.g., or a user may assign the name 320) to the machine learning model 305 to identify the machine learning model 305 from the set of machine learning models 305. The cloud platform 115-*b* may also assign a model API name for integration with the machine learning model 305 hosted on the second machine learning model and a description of the machine learning model.

Further, the machine learning model 305 may include a set of variables 310 which may be the inputs of the machine learning model 305. In some examples, the set of variables 310 may be pulled (e.g., extracted) from a data model object 325 associated with the data stored within the cloud platform 115-*b*. That is, the CRM data and the telematic data associated with the vehicle that the machine learning model 305 may be customized with identified using the data model object 325. Further, the set of variables 310 may be registered to the corresponding machine learning model 305 via a table of variables 330. In some examples, the table of variables 330 may include one or more fields corresponding to the set of variables 310. For example, the fields may include a variable name field, a variable API name field, a data model object field (e.g., for the data model object 325), a field name (e.g., the field name for the variable), and a type (e.g., text, number). It should be understood that there also may be other types of fields (e.g., a relationship name field and/or a refresh score field). As such, a user may use the table of variables 330 to register the set of variables 310 with the cloud platform 115-*b* the machine learning model 305 may be able to use the correct parameters from the data stored within cloud platform 115-*b*.

To connect the machine learning model 305 to the cloud platform 115-*b*, the cloud platform 115-*b* may also set an endpoint for the machine learning model 305. The endpoint may include an inference endpoint uniform resource locator (URL) (e.g., a URL of the second cloud platform 115 hosting the machine learning model 305), a data request format (e.g., a format for the second cloud platform 115 to request data from the cloud platform 115-*b*), and a data response format (e.g., a format for the second cloud platform 115 to transmit the machine learning model 305 predictions to the cloud platform 115-*b*). The endpoint may also be configured with an authentication, a secret key (e.g., an API generated key), an endpoint name, and an endpoint API name.

The cloud platform 115-*b* may also register the set of outputs 315 of the machine learning model 305. The set of outputs 315 of the machine learning model 305 may be registered with the cloud platform 115-*b* such that the cloud platform 115-*b* may correctly identify which machine learning model 305 the set of outputs 315 correspond to from a set of machine learning models 305. As such, the set of outputs 315 may be registered using a score object name 335, which may be an output data model object to store the response from the machine learning model 305, and a score object API name 340, which may be an output data model object API. Further, the set of outputs 315 may be registered to the cloud platform 115-*b* via a table of outputs 345. In some examples, the fields of the table of outputs 345 may include a name field, an API name field, a type field, and a JavaScript object notation (JSON) key field. As such, the cloud platform 115-*b* may be capable of recognizing and storing the response data from the set of outputs 315 of the machine learning model 305.

Further, once the machine learning model 305 is configured with the cloud platform 115-*b* or the configuration is edited, the machine learning model 305 may be activated or deactivated via an activation button 350. In some examples, if a machine learning model 305 is no longer being used, to save space within the cloud platform 115-*b* the machine learning model 305 may be deactivated via the activation button 350. In some other examples, if the machine learning model 305 is newly configured or edited in the cloud platform 115-*b*, the machine learning model 305 may be activated via the activation button 350. As such, the machine learning model 305 may be registered and configured with the cloud platform 115-*b* such that the machine learning model 305 may receive data stored within the cloud platform 115-*b* corresponding to the set of variables 310 and the machine learning model 305 may generate the set of variables 310 to be stored within the cloud platform 115-*b*.

In some examples, once the machine learning model 305 is built and trained within the second cloud platform 115, the machine learning model 305 may be registered with the cloud platform 115-*b* to allow the deployment of the machine learning model 305 to be used to generate prediction scores associated with maintenance procedures. As described elsewhere herein, the machine learning model 305 may use a data wrangler at the second cloud platform 115 to generate or access a set of training data from the data stored at the cloud platform 115-*b* (e.g., via an SQL query). In some examples, the data set used to generate the training data may be based on the CRM data, historic telematic data from sensors of a vehicle, or real-time thematic data from the sensors of the vehicle, the data including various features and measurements related to the vehicle and the condition of the vehicle's components and component systems (e.g., engine health). Using the set of training data, the second cloud platform 115 may build and train the machine learning model 305 (e.g., the machine learning model 305 being a SKlearn based model using the Scikit-learn machine learning programming language library for the Python computer programming language). The pipeline of the creation of the machine learning model 305 may first include imputing missing features. That is, the second cloud platform 115 may assign values to features or variables that may be missing from the training data by inferring the value of the features. Following, the second cloud platform 115 may standardize the features of the machine learning model 305 and perform label encoding for categorical features. Further, the second cloud platform 115 may perform one-hot encoding to convert the categorical data from the features into a format to be inputted into the machine learning model 305.

Lastly, to generate the machine learning model 305, the second cloud platform 115 may create a random forest classifier to generate the maintenance predictions (e.g., the prediction scores for the maintenance procedures). A random forest classifier may be a supervised learning algorithm that may build (e.g., generate) a set of decision trees. Further, the random forest classifier may be an estimator that may fit a quantity of decision tree classifiers on various sub-samples of the data from the cloud platform 115-*b* and may use averaging to improve the accuracy of the predictions generated by the machine learning model 305 while controlling over-fitting. Overfitting may be when an estimation model generates estimations that may fit to the training data, but such estimations may be inaccurate for predictions.

Further, to allow the machine learning model 305 to be able to communicate with the cloud platform 115-*b* the second cloud platform 115 may configure an endpoint for the machine learning model 305 within the second cloud platform 115 that corresponds to the cloud platform 115-*b*. In some examples, to invoke the endpoint, a lambda function may be built within the second cloud platform cloud platform 115. A lambda function may also be referred to as an anonymous function and may be defined without a name and while the lambda function may receive multiple input arguments, the lambda function may only evaluate, generate, and return one expression. Additionally, or alternatively, the lambda function may be configured with a docker file (e.g., a text document that includes all the commands a user may execute on a command line to assemble an image). Using the docker file and the lambda function, the second cloud platform 115 may then generate a representational state transfer (REST) API gateway endpoint to allow the second cloud platform 115 to communicate with the cloud platform 115-*b*. The second cloud platform 115 may then deploy the endpoint API and begin to communicate with the cloud platform 115-*b*.

Based on communications being enabled between the cloud platform 115-*b* and the second cloud platform 115, the machine learning model 305 may use sensor derived data along with CRM data to forecast or predict vehicle maintenance or repairs before the maintenance or repair would be expected. That is, the prediction may enable vehicle owners or vehicle maintenance service providers to proactively perform maintenance on a vehicle before a component or component system fails or affects the overall performance of the vehicle. By using such techniques described herein of the machine learning model 305 using both the telematic data from the sensors of a vehicle and CRM data to generate the predictions that may be supported by the communication link between the cloud platform 115-*b* and the second cloud platform 115, the overall performance of the vehicle may be enhanced. Further, the lifespan of the vehicle may increase accordingly, and the downtime of repairs may decrease by performing the maintenance procedures proactively. Additional descriptions of the techniques described herein may be described elsewhere herein including with reference to FIG. 4.

Figure 4:
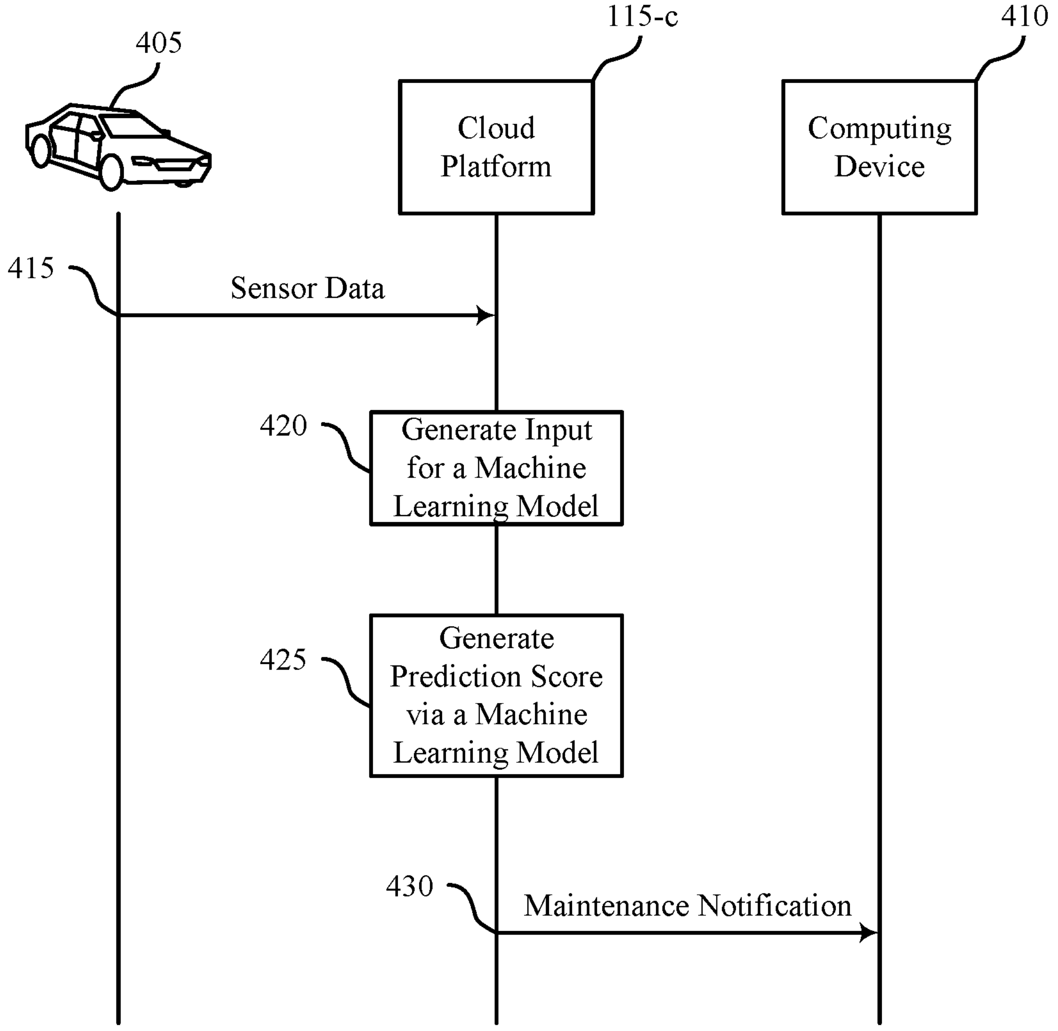
FIG. 4 shows an example of a configured to support that supports machine learning model deployment for equipment maintenance predictions in accordance with aspects of the present disclosure.

FIG. 4 shows an example of a process flow 400 that supports machine learning model deployment for equipment maintenance predictions in accordance with aspects of the present disclosure. In some examples, the process flow 400 may implement or may be implemented by the system 100 or the computing system 200. The process flow may include a vehicle 405, a cloud platform 115-*c*, and a computing device 410 which may be examples of devices or services described elsewhere herein including with reference to FIG. 1.

In the following description of the process flow 400, the operations may be performed by the vehicle 405, the cloud platform 115-*c*, and the computing device 410 in different orders or at different times. Some operations may also be left out of the process flow 400, or other operations may be added. Although the process flow 400 may be described as being performed by the vehicle 405, the cloud platform 115-*c*, and the computing device 410, some aspects of some operations may also be performed by other devices, services, or models described elsewhere herein including with reference to FIG. 1.

In some examples, prior to 415, a machine learning model may be trained using a set of data from the cloud platform 115-*c* and a set of data obtained from a set of vehicles 405 having a same vehicle type as the vehicle 405. Further, the set of data from the cloud platform 115-*c* may include CRM data associated with vehicle owners, vehicle dealers, or any combination thereof. Additionally, or alternatively, the cloud platform 115-*c* may be a CRM system. In some other examples, the machine learning model may be uploaded to one or more second cloud platforms 115 accessible by the cloud platform 115-*c*. The second cloud platform 115 may be different from the cloud platform 115-*c* and may be configured to use data from the cloud platform 115-*c* to train and execute the machine learning model while refraining from copying the data to the second cloud platform 115.

At 415, a set of data obtained from the vehicle 405 that includes one or more sensors may be obtained at the cloud platform 115-*c*. The one or more sensors of the vehicle 405 may measure one or more metrics of the vehicle 405. In some examples, the set of data may include engine rotational data, oil pressure data, fuel pressure data, coolant pressure data, oil temperature data, coolant temperature data, or any combination. Further, an indication may be received at the cloud platform 115-*c* of a mapping of each data parameter of the set of data to a respective model entity of the machine learning model.

At 420, the cloud platform 115-*c* may generate an input for the machine learning model, the input included the set of data from the one or more sensors of the vehicle 405. In some cases, the cloud platform 115-*c* may identify the machine learning model from a set of machine learning models based on a vehicle type of the vehicle 405. As such, each machine learning model of the set of machine learning models may be associated with a respective vehicle type of a set of vehicle types. That is, there may be a machine learning model for each vehicle type of the set of vehicle types. Further, the set of machine learning models may include one or more ensemble models.

At 425, a prediction score may be generated via the machine learning model. In some examples, as described herein, the machine learning model may be hosted by the second cloud platform 115 that may be separate from the cloud platform 115-*c*. As such, the second cloud platform 115 may generate the prediction score via the machine learning model. The prediction score may be a result of the machine learning model using the input generated at 420) that includes the set of data from the one or more sensors of the vehicle 405. In some cases, the machine learning model may generate the prediction score using both the set of data from the one or more sensors and the set of data (e.g., a second set of data) from the cloud platform 115-*c* that includes CRM data associated with vehicle owners, vehicle dealers, or any combination thereof. In some other cases, the machine learning model may generate the prediction score based on the mapping of the data parameters of the set of data to the respective model entity of the machine learning model. As such, the machine learning model may be trained based on the set of data obtained from the one or more sensors of the vehicle and the prediction score generated by the machine learning model.

At 430, the cloud platform 115-*c* may transmit, to the computing device 410 for display via a user interface of the computing device 410, a notification that indicates the maintenance procedure to be formed for the vehicle 405 based on the prediction score satisfying, or exceeding, a prediction score threshold. In some cases, the notification may be an email, a text message, a notification via a mobile application, or any combination thereof. Further, the cloud platform 115-*c* may transmit the notification by applying a notification rule that specifies (e.g., indicates) transmission parameters for transmitting the notification. For example, the notification may be transmitted to the computing device 410 of an owner of the vehicle 405, a vehicle maintenance service provider, a vehicle salesperson, or any combination thereof. Additionally, or alternatively, applying the notification rule may include ingesting data associated with the owner of the vehicle to determine the transmission parameters. In some cases, the cloud platform 115-*c* may transmit, to the computing device 410, an indication of one or more actions associated with the maintenance procedure, where e one or more actions are to be performed in the cloud platform 115-*c*, a maintenance service provider, the vehicle 405, or a combination thereof.

Figure 5:
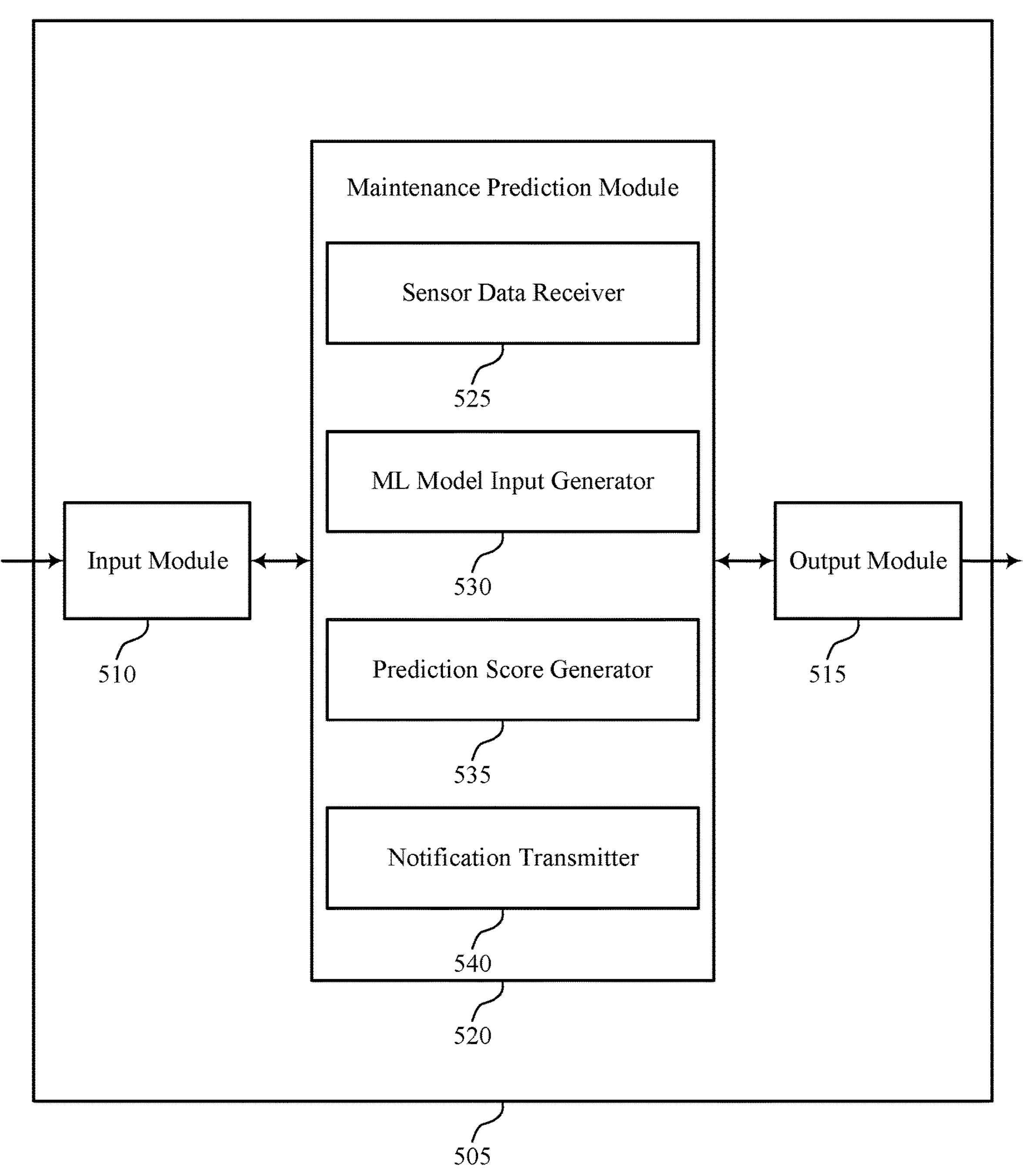
FIG. 5 shows a block diagram of an apparatus that supports machine learning model deployment for equipment maintenance predictions in accordance with aspects of the present disclosure.

FIG. 5 shows a block diagram 500 of a device 505 that supports machine learning model deployment for equipment maintenance predictions in accordance with aspects of the present disclosure. The device 505 may include an input module 510, an output module 515, and a maintenance prediction module 520. The device 505, or one or more components of the device 505 (e.g., the input module 510, the output module 515, and the maintenance prediction module 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOSR, ANDROIDR, MS-DOSR, MS-WINDOWS®, OS/2R, UNIXR, LINUXR, or another known operating system to handle input signals. The input module 510 may send aspects of these input signals to other components of the device 505 for processing. For example, the input module 510 may transmit input signals to the maintenance prediction module 520 to support machine learning model deployment for equipment maintenance predictions. In some cases, the input module 510 may be a component of an input/output (I/O) controller 710 as described with reference to FIG. 7.

The output module 515 may manage output signals for the device 505. For example, the output module 515 may receive signals from other components of the device 505, such as the maintenance prediction module 520, and may transmit these signals to other components or devices. In some examples, the output module 515 may transmit output signals for display in a user interface, for storage in a database or data store, for further processing at a server or server cluster, or for any other processes at any quantity of devices or systems. In some cases, the output module 515 may be a component of an I/O controller 710 as described with reference to FIG. 7.

For example, the maintenance prediction module 520 may include a sensor data receiver 525, an ML model input generator 530, a prediction score generator 535, a notification transmitter 540, or any combination thereof. In some examples, the maintenance prediction module 520, or various components thereof, may be configured to perform various operations (e.g., receiving, monitoring, transmitting) using or otherwise in cooperation with the input module 510, the output module 515, or both. For example, the maintenance prediction module 520 may receive information from the input module 510, send information to the output module 515, or be integrated in combination with the input module 510, the output module 515, or both to receive information, transmit information, or perform various other operations as described herein.

The maintenance prediction module 520 may support data processing in accordance with examples as disclosed herein. The sensor data receiver 525 may be configured to support receiving, at a cloud platform, a set of data obtained from a vehicle including one or more sensors, the one or more sensors of the vehicle measuring one or more metrics of the vehicle. The ML model input generator 530 may be configured to support generating an input for a machine learning model, the input including the set of data from the one or more sensors of the vehicle. The prediction score generator 535 may be configured to support generating, via the machine learning model, a prediction score that is indicative of a maintenance procedure to be performed for the vehicle, the prediction score being a result of the machine learning model using the input including the set of data from the one or more sensors of the vehicle. The notification transmitter 540 may be configured to support transmitting, to a computing device for display via user interface of the computing device, a notification that indicates the maintenance procedure to be performed for the vehicle based on the prediction score satisfying a prediction score threshold.

Figure 6:
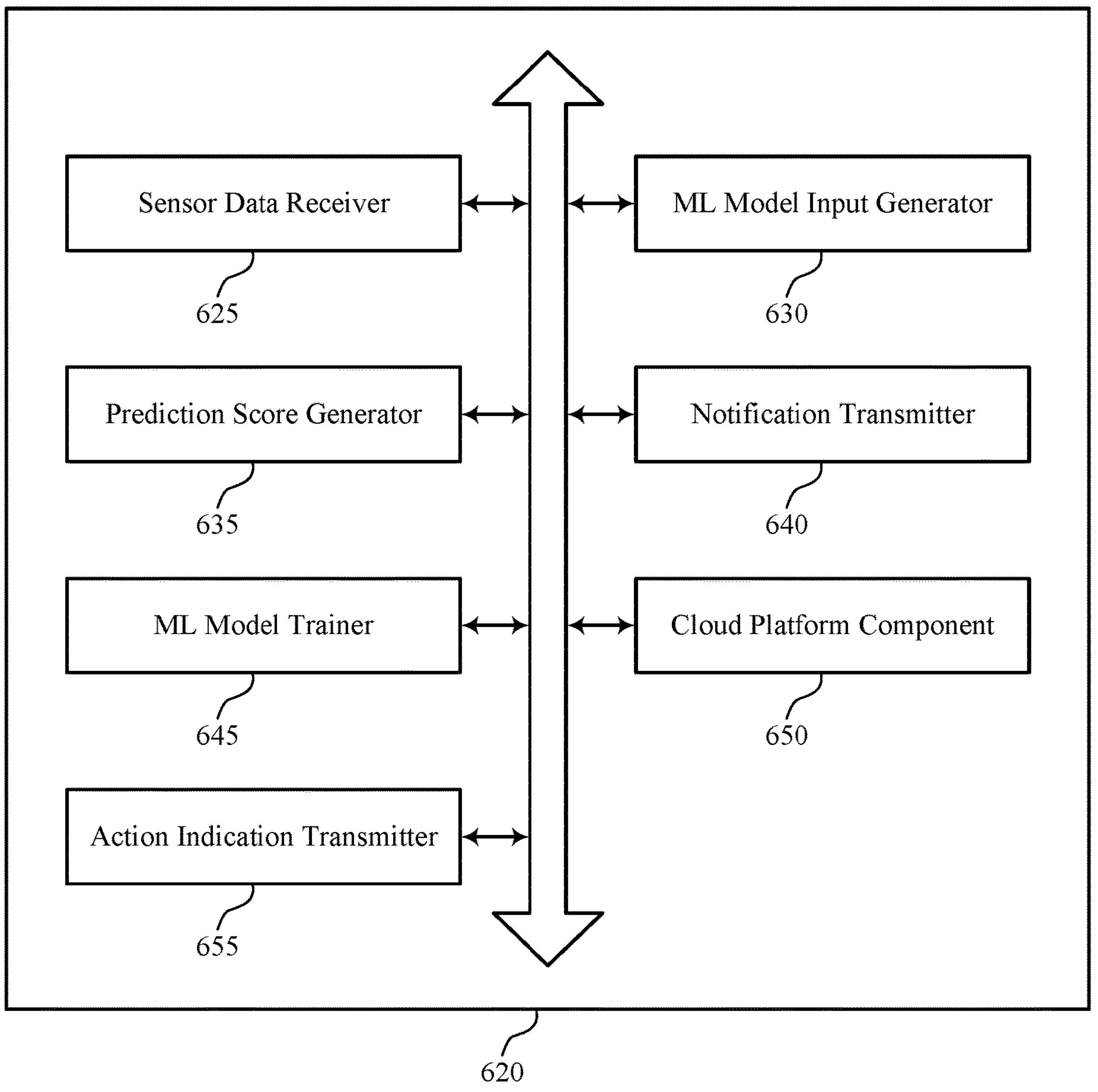
FIG. 6 shows a block diagram of a maintenance prediction module that supports machine learning model deployment for equipment maintenance predictions in accordance with aspects of the present disclosure.

FIG. 6 shows a block diagram 600 of a maintenance prediction module 620 that supports machine learning model deployment for equipment maintenance predictions in accordance with aspects of the present disclosure. The maintenance prediction module 620 may be an example of aspects of a maintenance prediction module or a maintenance prediction module 520, or both, as described herein. The maintenance prediction module 620, or various components thereof, may be an example of means for performing various aspects of machine learning model deployment for equipment maintenance predictions as described herein. For example, the maintenance prediction module 620 may include a sensor data receiver 625, an ML model input generator 630, a prediction score generator 635, a notification transmitter 640, an ML model trainer 645, a cloud platform component 650, an action indication transmitter 655, or any combination thereof. Each of these components, or components of subcomponents thereof (e.g., one or more processors, one or more memories), may communicate, directly or indirectly, with one another (e.g., via one or more buses).

The maintenance prediction module 620 may support data processing in accordance with examples as disclosed herein. The sensor data receiver 625 may be configured to support receiving, at a cloud platform, a set of data obtained from a vehicle including one or more sensors, the one or more sensors of the vehicle measuring one or more metrics of the vehicle. The ML model input generator 630 may be configured to support generating an input for a machine learning model, the input including the set of data from the one or more sensors of the vehicle. The prediction score generator 635 may be configured to support generating, via the machine learning model, a prediction score that is indicative of a maintenance procedure to be performed for the vehicle, the prediction score being a result of the machine learning model using the input including the set of data from the one or more sensors of the vehicle. The notification transmitter 640 may be configured to support transmitting, to a computing device for display via user interface of the computing device, a notification that indicates the maintenance procedure to be performed for the vehicle based on the prediction score satisfying a prediction score threshold.

In some examples, the ML model trainer 645 may be configured to support training the machine learning model using a second set of data from the cloud platform and a third set of data obtained from a set of multiple vehicles having a same vehicle type as the vehicle, where the second set of data includes customer relationship management (CRM) data associated with vehicle owners, vehicle dealers, or a combination thereof.

In some examples, to support generating the prediction score, the prediction score generator 635 may be configured to support generating, via the machine learning model, the prediction score using both the set of data from the one or more sensors of the vehicle and the second set of data from the cloud platform.

In some examples, the cloud platform is a CRM system.

In some examples, the ML model trainer 645 may be configured to support training the machine learning model based on the set of data obtained from the one or more sensors of the vehicle and the prediction score generated by the machine learning model.

In some examples, the ML model input generator 630 may be configured to support identifying the machine learning model, from a set of multiple machine learning models, based on a vehicle type of the vehicle, each machine learning model of the set of multiple machine learning models being associated with a respective vehicle type of a set of multiple vehicle types, where the set of multiple machine learning models includes one or more ensemble models.

In some examples, the cloud platform component 650 may be configured to support uploading the machine learning model to one or more second cloud platforms accessible by the cloud platform, where the second cloud platform is different from the cloud platform and is configured to use data from the cloud platform to train and execute the machine learning model without copying the data to the second cloud platform.

In some examples, the notification is an email, a text message, a notification via a mobile application, or any combination thereof.

In some examples, to support transmitting the notification, the notification transmitter 640 may be configured to support applying a notification rule that specifies transmission parameters for transmitting the notification, where the notification is transmitted to the computing device of an owner of the vehicle, a maintenance service provider, a vehicle salesperson, or any combination thereof based on the notification rule.

In some examples, applying the notification rule includes ingesting data associated with the owner of the vehicle to determine the transmission parameters.

In some examples, the set of data includes engine rotational data, oil pressure data, fuel pressure data, coolant pressure data, oil temperature data, coolant temperature data, or a combination thereof.

In some examples, the action indication transmitter 655 may be configured to support transmitting an indication of one or more actions associated with the maintenance procedure, where the one or more actions are to be performed in the cloud platform, a maintenance service provider, the vehicle, or a combination thereof.

In some examples, the prediction score generator 635 may be configured to support receiving, at the cloud platform, an indication of a mapping of each data parameter of the set of data to a respective model entity of the machine learning model, where the machine learning model generates the prediction score based on the mapping.

Figure 7:
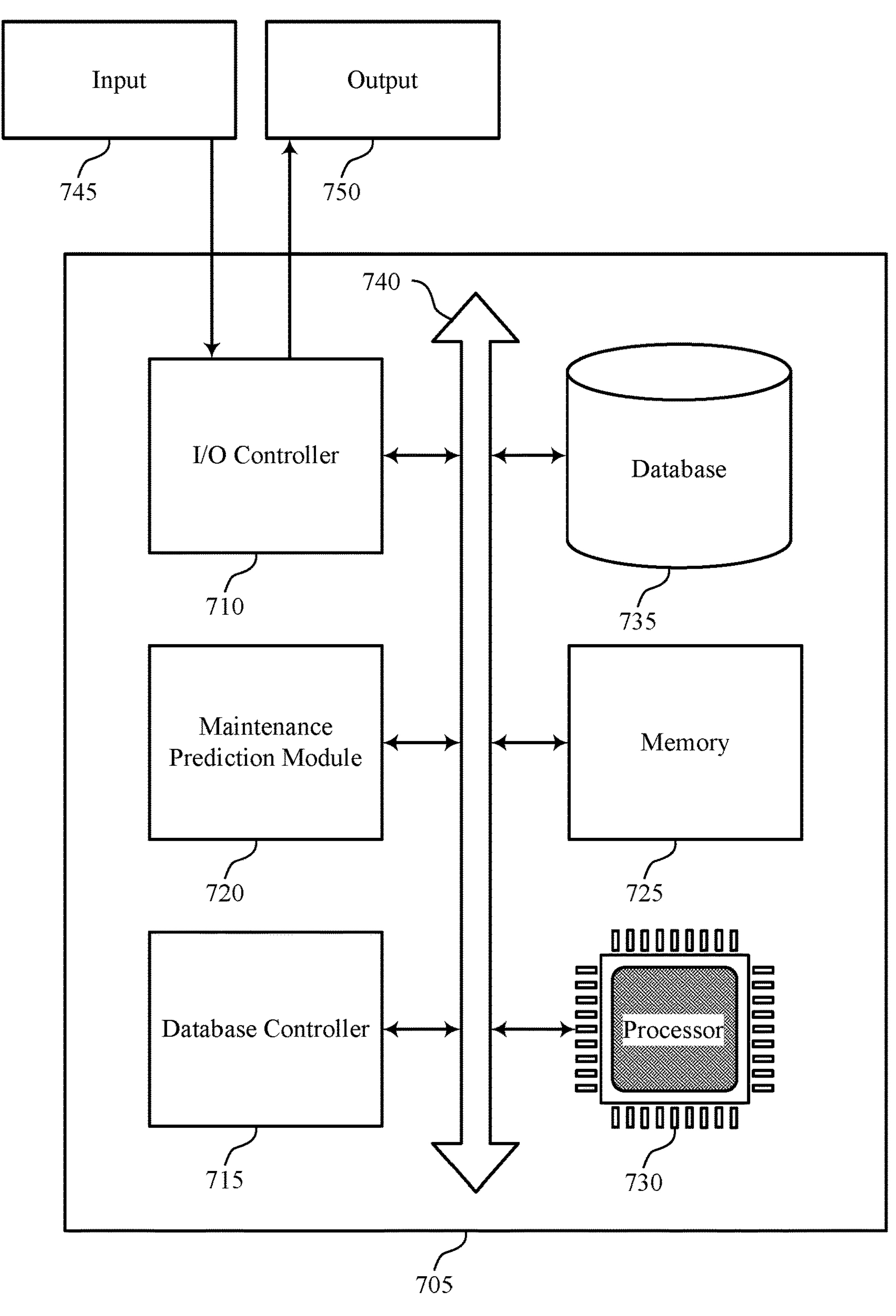
FIG. 7 shows a diagram of a system including a device that supports machine learning model deployment for equipment maintenance predictions in accordance with aspects of the present disclosure.

FIG. 7 shows a diagram of a system 700 including a device 705 that supports machine learning model deployment for equipment maintenance predictions in accordance with aspects of the present disclosure. The device 705 may be an example of or include the components of a device 505 as described herein. The device 705 may include components for bi-directional data communications including components for transmitting and receiving communications, such as a maintenance prediction module 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting machine learning model deployment for equipment maintenance predictions). The processor 730 may be an example of a single processor or multiple processors. For example, the device 705 may include one or more processors 730.

The maintenance prediction module 720 may support data processing in accordance with examples as disclosed herein. For example, the maintenance prediction module 720 may be configured to support receiving, at a cloud platform, a set of data obtained from a vehicle including one or more sensors, the one or more sensors of the vehicle measuring one or more metrics of the vehicle. The maintenance prediction module 720 may be configured to support generating an input for a machine learning model, the input including the set of data from the one or more sensors of the vehicle. The maintenance prediction module 720 may be configured to support generating, via the machine learning model, a prediction score that is indicative of a maintenance procedure to be performed for the vehicle, the prediction score being a result of the machine learning model using the input including the set of data from the one or more sensors of the vehicle. The maintenance prediction module 720 may be configured to support transmitting, to a computing device for display via user interface of the computing device, a notification that indicates the maintenance procedure to be performed for the vehicle based on the prediction score satisfying a prediction score threshold.

By including or configuring the maintenance prediction module 720 in accordance with examples as described herein, the device 705 may support techniques for a machine learning model to generate a maintenance prediction score using a combination of CRM data and real-time sensor data from a vehicle stored on a separate cloud platform than the machine learning model to improve the longevity of a vehicle, provide preventative maintenance to a vehicle, and to improve the use of the sensors of the vehicle.

Figure 8:
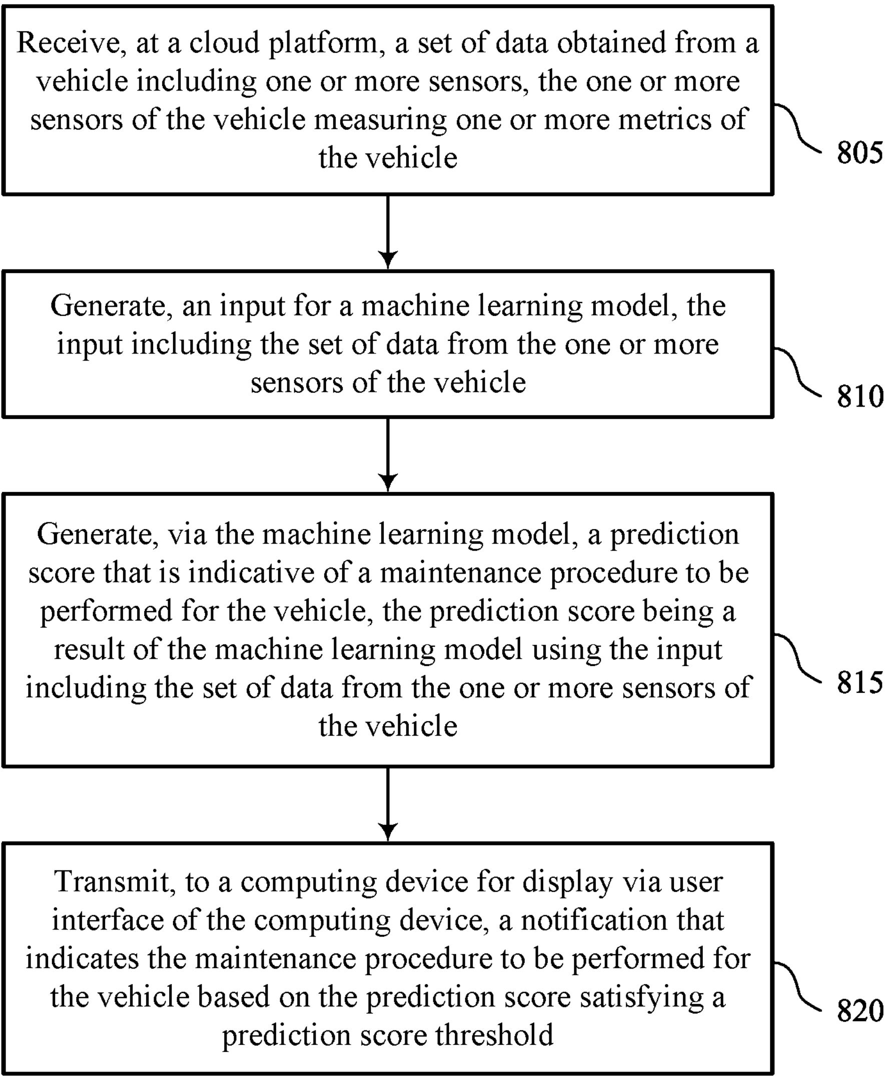
FIGS. 8 through 11 show flowcharts illustrating methods that support machine learning model deployment for equipment maintenance predictions in accordance with aspects of the present disclosure.

FIG. 8 shows a flowchart illustrating a method 800 that supports machine learning model deployment for equipment maintenance predictions in accordance with aspects of the present disclosure. The operations of the method 800 may be implemented by a cloud platform or its components as described herein. For example, the operations of the method 800 may be performed by a cloud platform as described with reference to FIGS. 1 through 7. In some examples, a cloud platform may execute a set of instructions to control the functional elements of the cloud platform to perform the described functions. Additionally, or alternatively, the cloud platform may perform aspects of the described functions using special-purpose hardware.

At 805, the method may include receiving, at a cloud platform, a set of data obtained from a vehicle including one or more sensors, the one or more sensors of the vehicle measuring one or more metrics of the vehicle. The operations of block 805 may be performed in accordance with examples as disclosed herein. In some examples, aspects of the operations of 805 may be performed by a sensor data receiver 625 as described with reference to FIG. 6.

At 810, the method may include generating an input for a machine learning model, the input including the set of data from the one or more sensors of the vehicle. The operations of block 810 may be performed in accordance with examples as disclosed herein. In some examples, aspects of the operations of 810 may be performed by an ML model input generator 630 as described with reference to FIG. 6.

At 815, the method may include generating, via the machine learning model, a prediction score that is indicative of a maintenance procedure to be performed for the vehicle, the prediction score being a result of the machine learning model using the input including the set of data from the one or more sensors of the vehicle. The operations of block 815 may be performed in accordance with examples as disclosed herein. In some examples, aspects of the operations of 815 may be performed by a prediction score generator 635 as described with reference to FIG. 6.

At 820, the method may include transmitting, to a computing device for display via user interface of the computing device, a notification that indicates the maintenance procedure to be performed for the vehicle based on the prediction score satisfying a prediction score threshold. The operations of block 820 may be performed in accordance with examples as disclosed herein. In some examples, aspects of the operations of 820 may be performed by a notification transmitter 640 as described with reference to FIG. 6.

Figure 9:
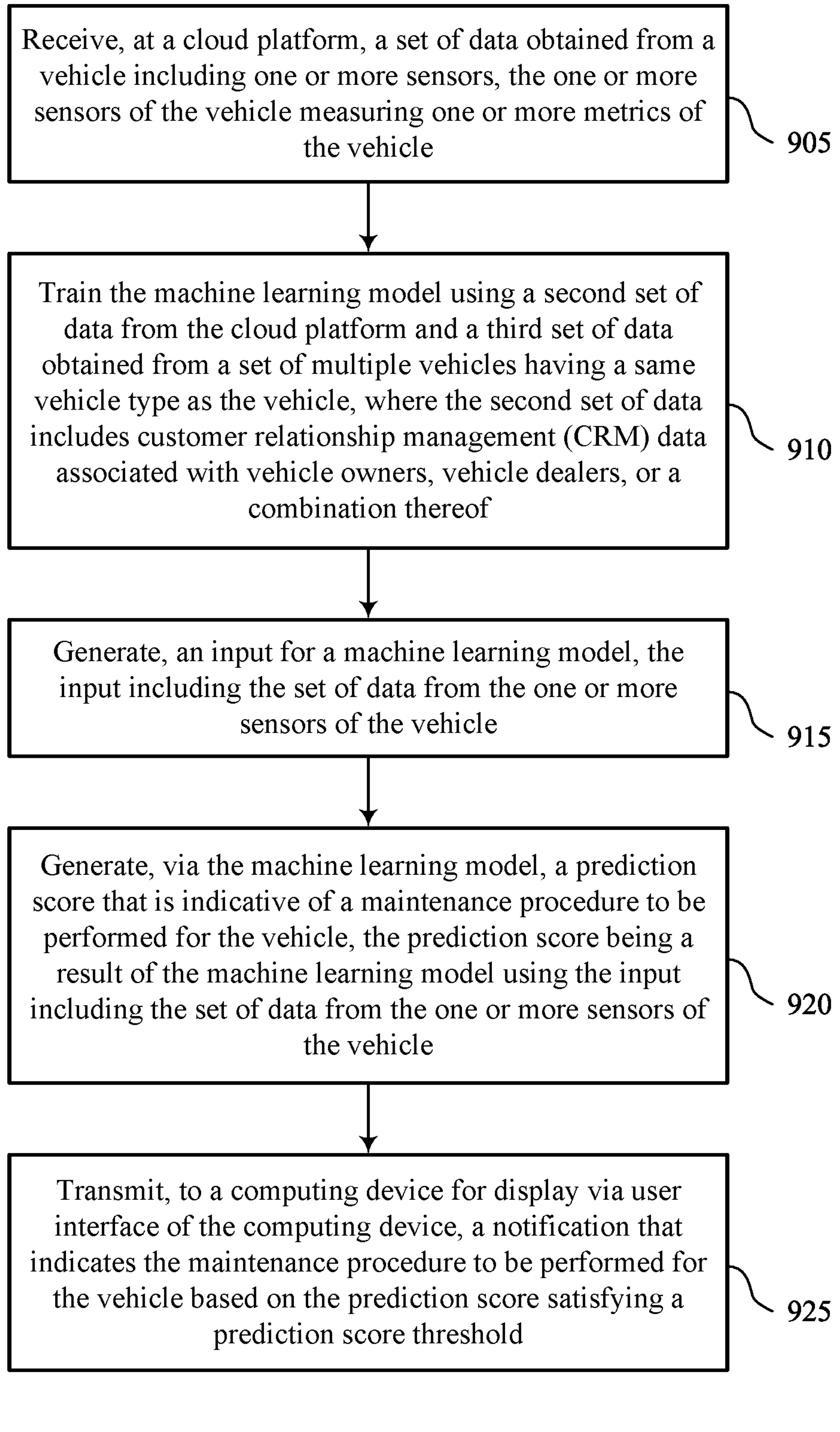

FIG. 9 shows a flowchart illustrating a method 900 that supports machine learning model deployment for equipment maintenance predictions in accordance with aspects of the present disclosure. The operations of the method 900 may be implemented by a cloud platform or its components as described herein. For example, the operations of the method 900 may be performed by a cloud platform as described with reference to FIGS. 1 through 7. In some examples, a cloud platform may execute a set of instructions to control the functional elements of the cloud platform to perform the described functions. Additionally, or alternatively, the cloud platform may perform aspects of the described functions using special-purpose hardware.

At 905, the method may include receiving, at a cloud platform, a set of data obtained from a vehicle including one or more sensors, the one or more sensors of the vehicle measuring one or more metrics of the vehicle. The operations of block 905 may be performed in accordance with examples as disclosed herein. In some examples, aspects of the operations of 905 may be performed by a sensor data receiver 625 as described with reference to FIG. 6.

At 910, the method may include training the machine learning model using a second set of data from the cloud platform and a third set of data obtained from a set of multiple vehicles having a same vehicle type as the vehicle, where the second set of data includes customer relationship management (CRM) data associated with vehicle owners, vehicle dealers, or a combination thereof. The operations of block 910 may be performed in accordance with examples as disclosed herein. In some examples, aspects of the operations of 910 may be performed by an ML model trainer 645 as described with reference to FIG. 6.

At 915, the method may include generating an input for a machine learning model, the input including the set of data from the one or more sensors of the vehicle. The operations of block 915 may be performed in accordance with examples as disclosed herein. In some examples, aspects of the operations of 915 may be performed by an ML model input generator 630 as described with reference to FIG. 6.

At 920, the method may include generating, via the machine learning model, a prediction score that is indicative of a maintenance procedure to be performed for the vehicle, the prediction score being a result of the machine learning model using the input including the set of data from the one or more sensors of the vehicle. The operations of block 920 may be performed in accordance with examples as disclosed herein. In some examples, aspects of the operations of 920 may be performed by a prediction score generator 635 as described with reference to FIG. 6.

At 925, the method may include transmitting, to a computing device for display via user interface of the computing device, a notification that indicates the maintenance procedure to be performed for the vehicle based on the prediction score satisfying a prediction score threshold. The operations of block 925 may be performed in accordance with examples as disclosed herein. In some examples, aspects of the operations of 925 may be performed by a notification transmitter 640 as described with reference to FIG. 6.

Figure 10:
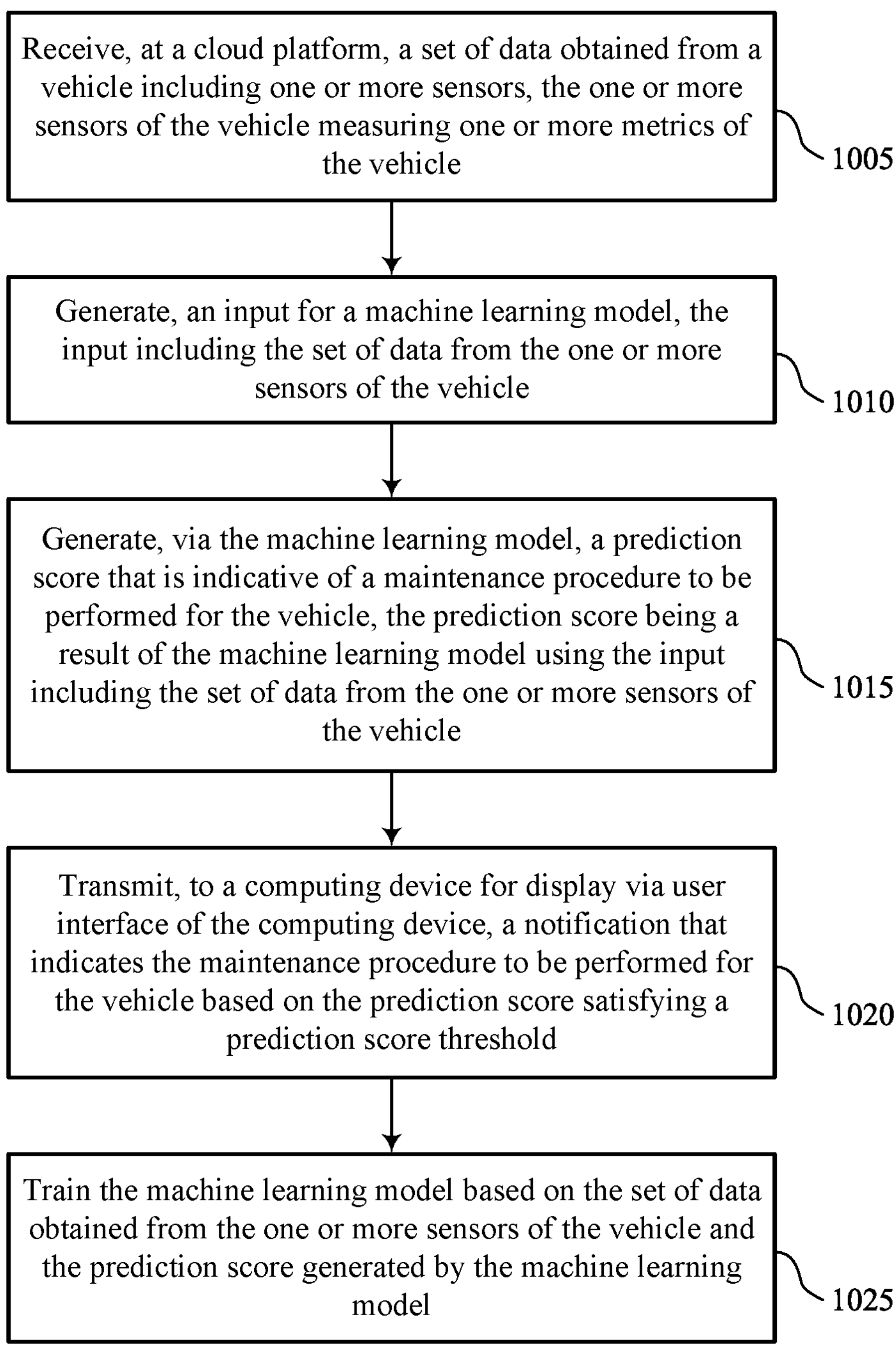

FIG. 10 shows a flowchart illustrating a method 1000 that supports machine learning model deployment for equipment maintenance predictions in accordance with aspects of the present disclosure. The operations of the method 1000 may be implemented by a cloud platform or its components as described herein. For example, the operations of the method 1000 may be performed by a cloud platform as described with reference to FIGS. 1 through 7. In some examples, a cloud platform may execute a set of instructions to control the functional elements of the cloud platform to perform the described functions. Additionally, or alternatively, the cloud platform may perform aspects of the described functions using special-purpose hardware.

At 1005, the method may include receiving, at a cloud platform, a set of data obtained from a vehicle including one or more sensors, the one or more sensors of the vehicle measuring one or more metrics of the vehicle. The operations of block 1005 may be performed in accordance with examples as disclosed herein. In some examples, aspects of the operations of 1005 may be performed by a sensor data receiver 625 as described with reference to FIG. 6.

At 1010, the method may include generating an input for a machine learning model, the input including the set of data from the one or more sensors of the vehicle. The operations of block 1010 may be performed in accordance with examples as disclosed herein. In some examples, aspects of the operations of 1010 may be performed by an ML model input generator 630 as described with reference to FIG. 6.

At 1015, the method may include generating, via the machine learning model, a prediction score that is indicative of a maintenance procedure to be performed for the vehicle, the prediction score being a result of the machine learning model using the input including the set of data from the one or more sensors of the vehicle. The operations of block 1015 may be performed in accordance with examples as disclosed herein. In some examples, aspects of the operations of 1015 may be performed by a prediction score generator 635 as described with reference to FIG. 6.

At 1020, the method may include transmitting, to a computing device for display via user interface of the computing device, a notification that indicates the maintenance procedure to be performed for the vehicle based on the prediction score satisfying a prediction score threshold. The operations of block 1020 may be performed in accordance with examples as disclosed herein. In some examples, aspects of the operations of 1020 may be performed by a notification transmitter 640 as described with reference to FIG. 6.

At 1025, the method may include training the machine learning model based on the set of data obtained from the one or more sensors of the vehicle and the prediction score generated by the machine learning model. The operations of block 1025 may be performed in accordance with examples as disclosed herein. In some examples, aspects of the operations of 1025 may be performed by an ML model trainer 645 as described with reference to FIG. 6.

Figure 11:
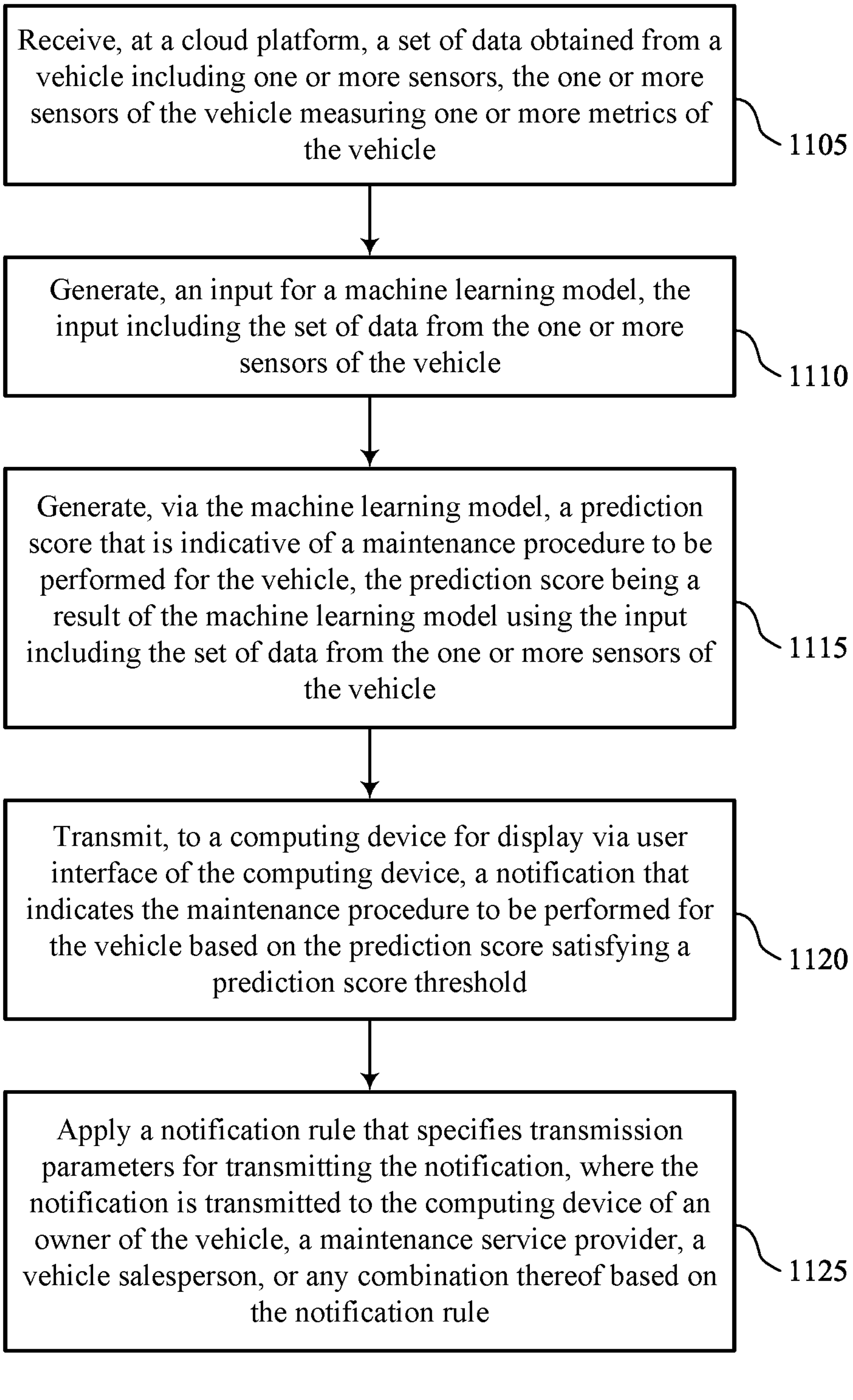

FIG. 11 shows a flowchart illustrating a method 1100 that supports machine learning model deployment for equipment maintenance predictions in accordance with aspects of the present disclosure. The operations of the method 1100 may be implemented by a cloud platform or its components as described herein. For example, the operations of the method 1100 may be performed by a cloud platform as described with reference to FIGS. 1 through 7. In some examples, a cloud platform may execute a set of instructions to control the functional elements of the cloud platform to perform the described functions. Additionally, or alternatively, the cloud platform may perform aspects of the described functions using special-purpose hardware.

At 1105, the method may include receiving, at a cloud platform, a set of data obtained from a vehicle including one or more sensors, the one or more sensors of the vehicle measuring one or more metrics of the vehicle. The operations of block 1105 may be performed in accordance with examples as disclosed herein. In some examples, aspects of the operations of 1105 may be performed by a sensor data receiver 625 as described with reference to FIG. 6.

At 1110, the method may include generating an input for a machine learning model, the input including the set of data from the one or more sensors of the vehicle. The operations of block 1110 may be performed in accordance with examples as disclosed herein. In some examples, aspects of the operations of 1110 may be performed by an ML model input generator 630 as described with reference to FIG. 6.

At 1115, the method may include generating, via the machine learning model, a prediction score that is indicative of a maintenance procedure to be performed for the vehicle, the prediction score being a result of the machine learning model using the input including the set of data from the one or more sensors of the vehicle. The operations of block 1115 may be performed in accordance with examples as disclosed herein. In some examples, aspects of the operations of 1115 may be performed by a prediction score generator 635 as described with reference to FIG. 6.

At 1120, the method may include transmitting, to a computing device for display via user interface of the computing device, a notification that indicates the maintenance procedure to be performed for the vehicle based on the prediction score satisfying a prediction score threshold. The operations of block 1120 may be performed in accordance with examples as disclosed herein. In some examples, aspects of the operations of 1120 may be performed by a notification transmitter 640 as described with reference to FIG. 6.

At 1125, the method may include applying a notification rule that specifies transmission parameters for transmitting the notification, where the notification is transmitted to the computing device of an owner of the vehicle, a maintenance service provider, a vehicle salesperson, or any combination thereof based on the notification rule. The operations of block 1125 may be performed in accordance with examples as disclosed herein. In some examples, aspects of the operations of 1125 may be performed by a notification transmitter 640 as described with reference to FIG. 6.

A method for data processing by an apparatus is described. The method may include receiving, at a cloud platform, a set of data obtained from a vehicle including one or more sensors, the one or more sensors of the vehicle measuring one or more metrics of the vehicle, generating, an input for a machine learning model, the input including the set of data from the one or more sensors of the vehicle, generating, via the machine learning model, a prediction score that is indicative of a maintenance procedure to be performed for the vehicle, the prediction score being a result of the machine learning model using the input including the set of data from the one or more sensors of the vehicle, and transmitting, to a computing device for display via user interface of the computing device, a notification that indicates the maintenance procedure to be performed for the vehicle based on the prediction score satisfying a prediction score threshold.

An apparatus for data processing is described. The apparatus may include one or more memories storing processor executable code, and one or more processors coupled with the one or more memories. The one or more processors may individually or collectively operable to execute the code to cause the apparatus to receive, at a cloud platform, a set of data obtained from a vehicle including one or more sensors, the one or more sensors of the vehicle measuring one or more metrics of the vehicle, generate, an input for a machine learning model, the input including the set of data from the one or more sensors of the vehicle, generate, via the machine learning model, a prediction score that is indicative of a maintenance procedure to be performed for the vehicle, the prediction score being a result of the machine learning model using the input including the set of data from the one or more sensors of the vehicle, and transmit, to a computing device for display via user interface of the computing device, a notification that indicates the maintenance procedure to be performed for the vehicle based on the prediction score satisfying a prediction score threshold.

Another apparatus for data processing is described. The apparatus may include means for receiving, at a cloud platform, a set of data obtained from a vehicle including one or more sensors, the one or more sensors of the vehicle measuring one or more metrics of the vehicle, means for generating, an input for a machine learning model, the input including the set of data from the one or more sensors of the vehicle, means for generating, via the machine learning model, a prediction score that is indicative of a maintenance procedure to be performed for the vehicle, the prediction score being a result of the machine learning model using the input including the set of data from the one or more sensors of the vehicle, and means for transmitting, to a computing device for display via user interface of the computing device, a notification that indicates the maintenance procedure to be performed for the vehicle based on the prediction score satisfying a prediction score threshold.

A non-transitory computer-readable medium storing code for data processing is described. The code may include instructions executable by one or more processors to receive, at a cloud platform, a set of data obtained from a vehicle including one or more sensors, the one or more sensors of the vehicle measuring one or more metrics of the vehicle, generate, an input for a machine learning model, the input including the set of data from the one or more sensors of the vehicle, generate, via the machine learning model, a prediction score that is indicative of a maintenance procedure to be performed for the vehicle, the prediction score being a result of the machine learning model using the input including the set of data from the one or more sensors of the vehicle, and transmit, to a computing device for display via user interface of the computing device, a notification that indicates the maintenance procedure to be performed for the vehicle based on the prediction score satisfying a prediction score threshold.

Some examples of the method, apparatus, and non-transitory computer-readable medium described herein may further include operations, features, means, or instructions for training the machine learning model using a second set of data from the cloud platform and a third set of data obtained from a set of multiple vehicles having a same vehicle type as the vehicle, where the second set of data includes customer relationship management (CRM) data associated with vehicle owners, vehicle dealers, or a combination thereof.

In some examples of the method, apparatus, and non-transitory computer-readable medium described herein, generating the prediction score may include operations, features, means, or instructions for generating, via the machine learning model, the prediction score using both the set of data from the one or more sensors of the vehicle and the second set of data from the cloud platform.

In some examples of the method, apparatus, and non-transitory computer-readable medium described herein, the cloud platform may be a CRM system.

Some examples of the method, apparatus, and non-transitory computer-readable medium described herein may further include operations, features, means, or instructions for training the machine learning model based on the set of data obtained from the one or more sensors of the vehicle and the prediction score generated by the machine learning model.

Some examples of the method, apparatus, and non-transitory computer-readable medium described herein may further include operations, features, means, or instructions for identifying the machine learning model, from a set of multiple machine learning models, based on a vehicle type of the vehicle, each machine learning model of the set of multiple machine learning models may be associated with a respective vehicle type of a set of multiple vehicle types, where the set of multiple machine learning models includes one or more ensemble models.

Some examples of the method, apparatus, and non-transitory computer-readable medium described herein may further include operations, features, means, or instructions for uploading the machine learning model to one or more second cloud platforms accessible by the cloud platform, where the second cloud platform may be different from the cloud platform and may be configured to use data from the cloud platform to train and execute the machine learning model without copying the data to the second cloud platform.

In some examples of the method, apparatus, and non-transitory computer-readable medium described herein, the notification may be an email, a text message, a notification via a mobile application, or any combination thereof.

In some examples of the method, apparatus, and non-transitory computer-readable medium described herein, transmitting the notification may include operations, features, means, or instructions for applying a notification rule that specifies transmission parameters for transmitting the notification, where the notification may be transmitted to the computing device of an owner of the vehicle, a maintenance service provider, a vehicle salesperson, or any combination thereof based on the notification rule.

Some examples of the method, apparatus, and non-transitory computer-readable medium described herein may further include operations, features, means, or instructions for applying the notification rule includes ingesting data associated with the owner of the vehicle to determine the transmission parameters.

Some examples of the method, apparatus, and non-transitory computer-readable medium described herein may further include operations, features, means, or instructions for transmitting an indication of one or more actions associated with the maintenance procedure, where the one or more actions may be to be performed in the cloud platform, a maintenance service provider, the vehicle, or a combination thereof.

In some examples of the method, apparatus, and non-transitory computer-readable medium described herein, the set of data includes engine rotational data, oil pressure data, fuel pressure data, coolant pressure data, oil temperature data, coolant temperature data, or a combination thereof.

Some examples of the method, apparatus, and non-transitory computer-readable medium described herein may further include operations, features, means, or instructions for receiving, at the cloud platform, an indication of a mapping of each data parameter of the set of data to a respective model entity of the machine learning model, where the machine learning model generates the prediction score based on the mapping.

The following provides an overview of aspects of the present disclosure:

Aspect 1: A method for data processing, comprising: receiving, at a cloud platform, a set of data obtained from a vehicle comprising one or more sensors, the one or more sensors of the vehicle measuring one or more metrics of the vehicle: generating, an input for a machine learning model, the input comprising the set of data from the one or more sensors of the vehicle: generating, via the machine learning model, a prediction score that is indicative of a maintenance procedure to be performed for the vehicle, the prediction score being a result of the machine learning model using the input comprising the set of data from the one or more sensors of the vehicle; and transmitting, to a computing device for display via user interface of the computing device, a notification that indicates the maintenance procedure to be performed for the vehicle based at least in part on the prediction score satisfying a prediction score threshold.

Aspect 2: The method of aspect 1, further comprising: training the machine learning model using a second set of data from the cloud platform and a third set of data obtained from a plurality of vehicles having a same vehicle type as the vehicle, wherein the second set of data comprises customer relationship management (CRM) data associated with vehicle owners, vehicle dealers, or a combination thereof.

Aspect 3: The method of aspect 2, wherein generating the prediction score further comprises: generating, via the machine learning model, the prediction score using both the set of data from the one or more sensors of the vehicle and the second set of data from the cloud platform.

Aspect 4: The method of any of aspects 2 through 3, wherein the cloud platform is a CRM system.

Aspect 5: The method of any of aspects 1 through 4, further comprising: training the machine learning model based at least in part on the set of data obtained from the one or more sensors of the vehicle and the prediction score generated by the machine learning model.

Aspect 6: The method of any of aspects 1 through 5, further comprising: identifying the machine learning model, from a plurality of machine learning models, based at least in part on a vehicle type of the vehicle, each machine learning model of the plurality of machine learning models is associated with a respective vehicle type of a plurality of vehicle types, wherein the plurality of machine learning models comprises one or more ensemble models.

Aspect 7: The method of any of aspects 1 through 6, further comprising: uploading the machine learning model to one or more second cloud platforms accessible by the cloud platform, wherein the second cloud platform is different from the cloud platform and is configured to use data from the cloud platform to train and execute the machine learning model without copying the data to the second cloud platform.

Aspect 8: The method of any of aspects 1 through 7, wherein the notification is an email, a text message, a notification via a mobile application, or any combination thereof.

Aspect 9: The method of any of aspects 1 through 8, wherein transmitting the notification comprises: applying a notification rule that specifies transmission parameters for transmitting the notification, wherein the notification is transmitted to the computing device of an owner of the vehicle, a maintenance service provider, a vehicle salesperson, or any combination thereof based at least in part on the notification rule.

Aspect 10: The method of aspect 9, wherein applying the notification rule comprises ingesting data associated with the owner of the vehicle to determine the transmission parameters.

Aspect 11: The method of any of aspects 1 through 10, further comprising: transmitting an indication of one or more actions associated with the maintenance procedure, wherein the one or more actions are to be performed in the cloud platform, a maintenance service provider, the vehicle, or a combination thereof.

Aspect 12: The method of any of aspects 1 through 11, wherein the set of data comprises engine rotational data, oil pressure data, fuel pressure data, coolant pressure data, oil temperature data, coolant temperature data, or a combination thereof.

Aspect 13: The method of any of aspects 1 through 12, further comprising: receiving, at the cloud platform, an indication of a mapping of each data parameter of the set of data to a respective model entity of the machine learning model, wherein the machine learning model generates the prediction score based at least in part on the mapping.

Aspect 14: An apparatus for data processing, comprising one or more memories storing processor-executable code, and one or more processors coupled with the one or more memories and individually or collectively operable to execute the code to cause the apparatus to perform a method of any of aspects 1 through 13.

Aspect 15: An apparatus for data processing, comprising at least one means for performing a method of any of aspects 1 through 13.

Aspect 16: A non-transitory computer-readable medium storing code for data processing, the code comprising instructions executable by one or more processors to perform a method of any of aspects 1 through 13.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a." "at least one," "one or more." "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:

receiving, at a cloud platform, a set of real-time data obtained from one or more sensors of a vehicle that comprises a set of components and the one or more sensors measuring one or more metrics of respective components of the set of components of the vehicle;

generating, an input for a machine learning model, the input comprising the set of real-time data from the one or more sensors of the vehicle;

generating, via the machine learning model and based on the input comprising the set of real-time data, a prediction score that is associated with a first component of the set of components and is further indicative of a predicted conditional impact on one or more second components of the vehicle that would result from performing versus not performing a maintenance procedure for the first component, wherein the one or more second components are different from the first component; and transmitting, to a computing device for display via a user interface of the computing device, a notification that indicates the maintenance procedure to be performed for the vehicle based at least in part on the prediction score satisfying a prediction score threshold, wherein the prediction score threshold is associated with preventing failure of the one or more second components based on the predicted conditional impact, and wherein transmission of the notification occurs prior to the failure of the first component, the one or more second components, or both.

2. The method of claim 1, further comprising:

training the machine learning model using a second set of data from the cloud platform and a third set of data obtained from a plurality of vehicles having a same vehicle type as the vehicle, wherein the second set of data comprises customer relationship management (CRM) data associated with vehicle owners, vehicle dealers, or a combination thereof.

3. The method of claim 2, wherein generating the prediction score further comprises:

generating, via the machine learning model, the prediction score using both the set of real-time data from the one or more sensors and the second set of data from the cloud platform.

4. The method of claim 2, wherein the cloud platform is a CRM system.

5. The method of claim 1, further comprising:

training the machine learning model based at least in part on the set of real-time data obtained from the one or more sensors of the vehicle and the prediction score generated by the machine learning model.

6. The method of claim 1, further comprising:

identifying the machine learning model, from a plurality of machine learning models, based at least in part on a vehicle type of the vehicle, each machine learning model of the plurality of machine learning models is associated with a respective vehicle type of a plurality of vehicle types, wherein the plurality of machine learning models comprises one or more ensemble models.

7. The method of claim 1, further comprising:

uploading the machine learning model to one or more second cloud platforms accessible by the cloud platform, wherein the one or more second cloud platforms are different from the cloud platform and is configured to use data from the cloud platform to train and execute the machine learning model without copying the data to the one or more second cloud platforms.

8. The method of claim 1, wherein the notification is an email, a text message, a notification via a mobile application, or any combination thereof.

9. The method of claim 1, wherein transmitting the notification comprises:

applying a notification rule that specifies transmission parameters for transmitting the notification, wherein the notification is transmitted to the computing device of an owner of the vehicle, a maintenance service provider, a vehicle salesperson, or any combination thereof based at least in part on the notification rule.

10. The method of claim 9, wherein applying the notification rule comprises ingesting data associated with the owner of the vehicle to determine the transmission parameters.

11. The method of claim 1, further comprising:

transmitting an indication of one or more actions associated with the maintenance procedure, wherein the one or more actions are to be performed in the cloud platform, performed by a maintenance service provider, performed for the vehicle, or a combination thereof.

12. The method of claim 1, wherein the set of real-time data comprises real-time indications of engine rotational data, oil pressure data, fuel pressure data, coolant pressure data, oil temperature data, coolant temperature data, or a combination thereof for the vehicle.

13. The method of claim 1, further comprising:

receiving, at the cloud platform, an indication of a mapping of each data parameter of the set of real-time data to a respective model entity of the machine learning model, wherein the machine learning model generates the prediction score based at least in part on the mapping.

14. An apparatus for data processing, comprising:

one or more memories storing processor-executable code; and one or more processors coupled with the one or more memories and individually or collectively operable to execute the code to cause the apparatus to:

receive, at a cloud platform, a set of real-time data obtained from one or more sensors of a vehicle that comprises a set of components and the one or more sensors measuring one or more metrics of respective components of the set of components of the vehicle;

generate, an input for a machine learning model, the input comprising the set of real-time data from the one or more sensors of the vehicle;

generate, via the machine learning model and based on the input comprising the set of real-time data, a prediction score that is associated with a first component of the set of components and is further indicative of a predicted conditional impact on one or more second components of the vehicle that would result from performing versus not performing a maintenance procedure for the first component, wherein the one or more second components are different from the first component; and transmit, to a computing device for display via a user interface of the computing device, a notification that indicates the maintenance procedure to be performed for the vehicle based at least in part on the prediction score satisfying a prediction score threshold, wherein the prediction score threshold is associated with preventing failure of the one or more second components based on the predicted conditional impact and wherein transmission of the notification occurs prior to the failure of the first component, the one or more second components, or both.

15. The apparatus of claim 14, wherein the one or more processors are individually or collectively further operable to execute the code to cause the apparatus to:

train the machine learning model using a second set of data from the cloud platform and a third set of data obtained from a plurality of vehicles having a same vehicle type as the vehicle, wherein the second set of data comprises customer relationship management (CRM) data associated with vehicle owners, vehicle dealers, or a combination thereof.

16. The apparatus of claim 15, wherein, to generate the prediction score, the one or more processors are individually or collectively further operable to execute the code to cause the apparatus to:

generate, via the machine learning model, the prediction score using both the set of real-time data from the one or more sensors of the vehicle and the second set of data from the cloud platform.

17. The apparatus of claim 14, wherein the one or more processors are individually or collectively further operable to execute the code to cause the apparatus to:

upload the machine learning model to one or more second cloud platforms accessible by the cloud platform, wherein the one or more second cloud platforms are different from the cloud platform and is configured to use data from the cloud platform to train and execute the machine learning model without copying the data to the one or more second cloud platforms.

18. A non-transitory computer-readable medium storing code for data processing, the code comprising instructions executable by one or more processors to:

receive, at a cloud platform, a set of real-time data obtained from one or more sensors of a vehicle that comprises a set of components and the one or more sensors measuring one or more metrics of respective components of the set of components of the vehicle;

generate, an input for a machine learning model, the input comprising the set of real-time data from the one or more sensors of the vehicle;

generate, via the machine learning model and based on the input comprising the set of real-time data, a prediction score that is associated with a first component of the set of components and is further indicative of a predicted conditional impact on one or more second components of the vehicle that would result from performing versus not performing a maintenance procedure for the first component, wherein the one or more second components are different from the first component; and transmit, to a computing device for display via a user interface of the computing device, a notification that indicates the maintenance procedure to be performed for the vehicle based at least in part on the prediction score satisfying a prediction score threshold, wherein the prediction score threshold is associated with preventing failure of the one or more second components based on the predicted conditional impact, and wherein transmission of the notification occurs prior to the failure of the first component, the one or more second components, or both.

19. The non-transitory computer-readable medium of claim 18, wherein the instructions are further executable by the one or more processors to:

train the machine learning model using a second set of data from the cloud platform and a third set of data obtained from a plurality of vehicles having a same vehicle type as the vehicle, wherein the second set of data comprises customer relationship management (CRM) data associated with vehicle owners, vehicle dealers, or a combination thereof.

20. The non-transitory computer-readable medium of claim 18, wherein the instructions are further executable by the one or more processors to:

upload the machine learning model to one or more second cloud platforms accessible by the cloud platform, wherein the one or more second cloud platforms are different from the cloud platform and is configured to use data from the cloud platform to train and execute the machine learning model without copying the data to the one or more second cloud platforms.

* * * * *